(12) United States Patent
Rorke

(10) Patent No.: US 10,947,606 B2
(45) Date of Patent: Mar. 16, 2021

(54) HEAP LEACHING METHOD

(71) Applicant: BHP Billiton Olympic Dam Corporation Pty Ltd, Melbourne (AU)

(72) Inventor: Gary Vernon Rorke, Christchurch (NZ)

(73) Assignee: BHP Billiton Olympic Dam Corporation Pty Ltd, Melbourne (AU)

( * ) Notice: Subject to any disclaimer, the term of this patent is extended or adjusted under 35 U.S.C. 154(b) by 265 days.

(21) Appl. No.: 15/537,544

(22) PCT Filed: Dec. 17, 2015

(86) PCT No.: PCT/AU2015/050806
§ 371 (c)(1),
(2) Date: Jun. 19, 2017

(87) PCT Pub. No.: WO2016/094956
PCT Pub. Date: Jun. 23, 2016

(65) Prior Publication Data
US 2017/0349972 A1    Dec. 7, 2017

(30) Foreign Application Priority Data

Dec. 17, 2014 (AU) .............................. 2014905118
May 8, 2015 (AU) .............................. 2015901661

(51) Int. Cl.
*C22B 60/02* (2006.01)
*C22B 3/00* (2006.01)
*C22B 15/00* (2006.01)

(52) U.S. Cl.
CPC ............ *C22B 60/023* (2013.01); *C22B 11/04* (2013.01); *C22B 15/0069* (2013.01); *C22B 15/0071* (2013.01); *Y02P 10/20* (2015.11)

(58) Field of Classification Search
CPC .................................................. C22B 60/023
See application file for complete search history.

(56) References Cited

U.S. PATENT DOCUMENTS 4,017,309 A   4/1977 Johnson
5,236,492 A   8/1993 Shaw et al.

FOREIGN PATENT DOCUMENTS

| | | |
|---|---|---|
| CL | 1411-1996 | 5/1997 |
| EP | 1424403 A1 | 2/2004 |
| EP | 1559799 A2 | 8/2005 |
| WO | 9819779 A1 | 5/1998 |
| WO | WO 2014/030048 | 2/2014 |

(Continued)

OTHER PUBLICATIONS

International Search Report (4 pages) dated Mar. 7, 2016 out of PCT priority Application PCT/AU2015/050806.

(Continued)

*Primary Examiner* — Melissa S Swain
(74) *Attorney, Agent, or Firm* — Brinks Gilson & Lione

(57) ABSTRACT

A method for recovering one or more of copper, uranium and a precious metal from an ore material, including: (a) forming a heap of the ore material; (b) during active heap irrigation, contacting the heap of the ore material with an iron containing acidic leach liquor having a high chloride content in the presence of an oxygen containing gas, and producing a pregnant leach solution; and (c) recovering one or more of copper, uranium and a precious metal from the pregnant leach solution.

22 Claims, 17 Drawing Sheets

(56) References Cited

FOREIGN PATENT DOCUMENTS

WO   WO 2014/040136   3/2014
WO   WO 2014/169325   10/2014

OTHER PUBLICATIONS

Written Opinion (6 pages) dated Mar. 7, 2016 out of PCT priority Application PCT/AU2015/050806.
CN 201580074268.2 filed Dec. 17, 2015, Second Office Action dated Dec. 4, 2018, English translation.
EA 201791360/28 filed Dec. 17, 2015, Notification dated Apr. 23, 2019, English translation.
ARIPO Application No. AP/P/2017/010010 filed Dec. 17, 2015, Notification of Non-Compliance with Substantive Requirements and Invitation to Submit Observations and/or Amended Application dated Sep. 18, 2019.
Chilean Application No. 201701589 filed Jun. 16, 2017, first Office Action dated Nov. 18, 2019.
Australia Application No. 2015367301 filed Dec. 17, 2015, Examination Report No. 1 dated Jun. 18, 2020.
Chile Application No. 201701589 filed Jun. 16, 2017, Objection dated Jul. 25, 2018.

HEAP LEACHING METHOD

This application claims priority to International Application No. PCT/AU2015/050806 filed Dec. 17, 2015; Australian Application No. 2014905118 filed Dec. 17, 2014; and Australian Application No. 2015901661 filed May 8, 2015; the entire contents of each are incorporated herein by reference.

TECHNICAL FIELD

The present disclosure relates to a method for heap leaching ore. In particular, the present disclosure relates to a method for heap leaching copper and/or uranium containing ore which includes using a high chloride leach liquor. The method may be used for heap leaching of copper from principally sulphide minerals such as chalcocite, covellite, bornite and chalcopyrite, or a mixed sulphide with copper oxide mineral. The method may additionally or instead be used for leaching uranium from such uranium minerals as uraninite, coffinite and brannerite. The method may instead or additionally be used to leach precious metals, such as gold and/or silver.

These applications are however exemplary only and are non-limiting for the principles of the disclosed method may be used for the recovery of base metals such as nickel from nickel sulphide minerals e.g. pentlandite and millerite, and for the recovery of zinc from zinc sulphide minerals. The method is described hereinafter with reference to the use of a high chloride mediated, high solution potential, heap leaching of run-of-mine (ROM) or crushed ore material.

BACKGROUND ART

Mineral deposits in the Stuart Shelf, Australia, generally contain three metal values, namely copper, uranium and precious metals (mainly gold and silver). The copper is principally in the form of sulphide minerals such as Chalcocite ($Cu_2S$), Bornite ($Cu_5FeS_4$) and Chalcopyrite ($CuFeS_2$). The uranium is principally in the form of such minerals as Uraninite, Coffinite and Brannerite. The common gangue minerals may include quartz, hematite, feldspar, sericite, fluorite, siderite, chlorite and pyrite.

It has recently been proposed to recover metal values from the Stuart Shelf ore minerals by a process including a heap leaching step. A disadvantage of heap leaching is the relatively slow leach rates of ore minerals. In addition, the surfaces of some ore minerals, particularly copper sulphides such as chalcopyrite, can become passivated during the leaching step which can further reduce the leaching rate and lower the overall metal recovery.

PCT/IB2013/001810, in the name of BHP Chile Inc., discloses a process of extracting copper from copper sulphide minerals in which ore is subjected to a pre-treatment phase followed by an active leach cycle. During the pre-treatment phase, the copper sulphide minerals are contacted with a solution having a high chloride concentration, a solution potential above 700 mV (SHE) and a dissolved oxygen level below 1 mg/L. In the case of a heap leaching operation, the pretreatment step is conducted for a period of up to 200 days prior to commencement of active heap irrigation.

It would be desirable to provide an alternative heap leaching method for increased leaching rate of ore minerals that may be conducted without requiring a pretreatment phase and can instead be conducted during an active leach cycle.

The above references to the background art do not constitute an admission that the art forms a part of the common general knowledge of a person of ordinary skill in the art. The above references are also not intended to limit the application of the methods as disclosed herein.

SUMMARY OF THE DISCLOSURE

The present disclosure is based on the discovery that the addition of high amounts of chloride to an oxidising sulphuric acid based leaching process in the presence of soluble iron, results in the leaching process operating at higher solution redox potentials. The presence of chloride, and to a lesser extent copper, increases the rate at which ferrous iron is oxidised to the trivalent state (ferric). A greater concentration of ferric equates to higher solution redox potentials. Metal recovery from ore minerals may be enhanced at increased solution redox potentials, such as at redox potentials exceeding 450 mV Ag/AgCl (approx. 660 mV SHE). This may be achieved, for example, by contacting the minerals during active heap irrigation with an acid solution having a high oxidation potential resulting from an elevated chloride content.

The present disclosure is also based on the discovery that the phenomena of "passivation" of chalcopyrite during leaching at increased solution oxidation potential may be avoided, or the onset delayed to higher redox potentials, in the presence of high chloride levels in solution.

As used herein "a heap" includes a heap, a dump, a vat or a column which contains an ore which is to be processed.

As used herein "active heap irrigation" means the process of actively applying a solution to a heap such that it moves through the heap to cause leaching of ore minerals within the heap. The solution may comprise a leach liquor per se, or it may combine with other components within the heap (such as salt or acid) to form a leach liquor in situ. The solution may be applied by irrigating the heap, such as by using an irrigation grid. The heap may also be aerated during the active heap irrigation.

The active leach irrigation may be continuous. For example, there may be no "rest" stages, during which application of solution to the heap is suspended, after active leach irrigation commences.

In one aspect there is disclosed a method for recovering one or more of copper, uranium and a precious metal from an ore material, including:
a. forming a heap of the ore material;
b. during active heap irrigation, contacting the heap of the ore material with an iron containing acidic leach liquor having a high chloride content in the presence of an oxygen containing gas, and producing a pregnant leach solution; and
c. recovering one or more of copper, uranium and a precious metal from the pregnant leach solution.

The ore material may be ore and/or an ore concentrate. The ore material may comprise the product of a prior leaching operation, such as a heap leach ripios.

The "leach liquor" is the solution that contacts the ore. It may be formed separately and applied to the ore. Alternatively, it may be at least partially formed in situ from a combination of the applied irrigation solution, the concentrated sulphuric acid in the agglomerated ore and the in situ dissolution of any salt in the agglomerated ore.

In one embodiment of the process, the ore material contains copper sulphides and uranium minerals. The ore material may additionally contain one or more precious metals selected from gold and/or silver.

In one embodiment of the process, the chloride content in the leach liquor is a minimum of 15 g/L.

In one embodiment of the process, the chloride content in the leach liquor is a minimum of 30 g/L.

In one embodiment of the process, the chloride content in the leach liquor is a minimum of 45 g/L.

In one embodiment of the process, the chloride content in the leach liquor is preferably a minimum of 50 g/L. Preferably, the chloride content is at least 70 g/L.

In one embodiment of the process, the chloride content in the leach liquor is a minimum of 90 g/L. The chloride content may be a minimum of 100 g/L, such as a minimum of 105 g/L.

In one embodiment of the process, the chloride content in the leach liquor is a minimum of 130 g/L.

In one embodiment of the process, the chloride content in the leach liquor is a minimum of 150 g/L.

In one embodiment of the process, the chloride content in the leach liquor may be a maximum of 190 g/L.

In one embodiment of the process, the chloride content in the leach liquor may be a maximum of 230 g/L.

In one embodiment of the process, the chloride content in the leach liquor ranges from around 70 g/L up to 150 g/L. The chloride content may preferably range from about 90 to about 110 g/L.

In one embodiment of the process, the oxygen containing gas is air. In another embodiment, the oxygen containing gas is oxygen-enriched air.

In one embodiment of the process, the iron containing leach liquor contains ferric ions which oxidise the ore material to dissolve one or more metals, resulting in reduction to ferrous ions. The ferrous ions are then reoxidised to ferric ions by reaction with the oxygen containing gas.

In one embodiment of the process, the iron containing leach liquor also contains cupric ions that catalyse the reaction of ferrous to ferric ions. The catalytic effect of the cupric ions may diminish above a concentration of approximately 1 g/L Cu.

The ore material may also contain one or more iron containing minerals. The iron containing minerals may include gangue minerals, such as one or more of hematite, siderite and chlorite. These minerals may partly or wholly comprise the source of the iron in the iron containing leach liquor. The copper sulphides may partly or wholly comprise the source of cupric ions in the acidic leach liquor.

In one embodiment of the process, the ore material is agglomerated prior to forming a heap. Agglomeration may be effected by mixing the ore material with a desired quantity of acidic agglomerating solution to give the agglomerates the desired final moisture content. The desired final moisture content may be up to 25 wt %. In an embodiment, the final moisture is less than 10 wt %, such as less than 8 wt %. In an embodiment, the final moisture is a minimum of 3.5 wt. %. The acidic agglomerating solution may comprise a combination of process solution (eg, recycled leach liquor or heap leach raffinate) and concentrated sulphuric acid. The acidic agglomerating solution may be added to the ore material in the range of 0 to approximately 20 kg/ton. In one embodiment of the process, the addition is in the range 6 to 12 kg/ton ore.

The acid addition at this level may result in process improvement by reducing silica levels in solution. Solubilized silica becomes problematic as it preferentially precipitates at the surface of the heaps and causes permeability problems. It can be removed from solution by the addition of poly ethyl glycol (PEG) to the part of the first stage leachate. However, it can be preferential to minimize soluble silica from the start. Increasing chloride concentration has also been shown to further reduce soluble silica. The precipitated silica from PEG addition may be settled in a clarifier and recycled to agglomeration as a method of disposal.

The chloride content in the leach liquor may be at least partially derived from water which naturally contains salt, e.g. water drawn from underground bores, or from the sea or a salt lake or reservoir. Alternatively, the water may be brine, produced for example as a by-product during a desalination process.

In one embodiment, in order to attain the ultimate required chloride concentration in the leach liquor, a solid chloride salt may be added to the ore material during or post agglomeration. The solid chloride salt may be one or more of the following: NaCl, $MgCl_2$, KCl and $AlCl_3$. The salt may be added directly to the ore material (as opposed to adding it directly to the solution applied to the heap). This enables the salt to be then dissolved in situ during active irrigation resulting in the heap acting as a fines filter for any insoluble impurities. However, the addition of salt to the ore material during or post agglomeration would not be appropriate in the second modification of the disclosed process as discussed further below.

The salt may be instead added to the irrigation solution prior to its application to the heap. However, this may require a tank in which to mix the salt and solution and filtration to prevent insoluble components in the salt from blocking the heap leach irrigation system.

The salt may be added to the ore material prior to agglomeration in all but the second modification of the process (discussed below). However, in this embodiment, the salt may react with the acid during subsequent agglomeration and HCl fumes are released.

In one embodiment of the process, the salt is added to the ore material after it has been agglomerated. In this embodiment, the production of HCl fumes can be reduced or avoided. In this embodiment, the concentration of sulphuric acid in the agglomerated ore may be diluted by reaction with gangue minerals in the ore material. The salt may be added onto the conveyor carrying the agglomerated product.

In one embodiment of the process, the solution is applied to the heap by irrigation.

The redox potential of the leach liquor will be influenced by the salinity of the leach liquor and generally, the higher the salinity, the higher the redox potential.

In one embodiment of the process, the redox potential of the leach liquor exceeds 420 mV Ag/AgCl, such as greater than 425 mV Ag/AgCl in the absence of bioleaching microorganisms.

In one embodiment of the process, the redox potential of the leach liquor exceeds 430 mV Ag/AgCl, such as greater than 440 mV Ag/AgCl in the absence of bioleaching microorganisms.

In one embodiment of the process, the redox potential of the leach liquor exceeds 450 mV Ag/AgCl (approx. 660 mV SHE), in the absence of bioleaching microorganisms.

In one embodiment of the process, the redox potential of the leach liquor exceeds 460 mV Ag/AgCl, in the absence of bioleaching microorganisms.

In one embodiment of the process, the redox potential of the leach liquor exceeds 470 mV Ag/AgCl, such as around 480 mV Ag/AgCl, in the absence of bioleaching microorganisms.

In one embodiment of the process, the total iron concentration of the leach liquor is >0.1 g/L. The total iron concentration may be at least 5 g/L. In an embodiment, the total iron concentration is at least 20 g/L, such as at least 25 g/L. The total iron concentration may be a maximum of 50 g/L. In another embodiment, the total iron concentration is a maximum of 80 g/L.

The pH of the leach liquor during the active leach cycle is effected by the addition of sulphuric acid directly to the ore during the prior agglomeration process or by the addition of sulphuric acid to the solution which contacts the ore during irrigation or by using both techniques.

During the course of the heap leach process, the pH of the leach liquor may vary as it reacts with ore and gangue minerals. However, the acidity is such that the pH of the solution contacting the ore may not exceed pH 3.5. In another embodiment, the pH is below pH 3. In another embodiment, the pH may be less than 1. In another embodiment, the pH may be less than −0.3.

In one embodiment of the process, the dissolved oxygen level in the leach liquor contacting the ore may vary significantly from very low values to approximately saturation during the heap leach. Accordingly, the DO may be above 0 mg/L (0 ppm). The maximum dissolved oxygen may be the value at saturation. The dissolved oxygen may be at least 3 ppm. In an embodiment, it is less than 10 ppm. In another embodiment it is at least 5 ppm. At any point in the process, the DO will be at the equilibrium established between the rate of transfer from the supplied gas and the rate of consumption by reaction in solution. The dissolved oxygen level in the leach liquor contacting the ore may be maintained by forced aeration.

The method may include the step of providing an irrigation grid whereby the irrigation solution is applied to the heap. The irrigation grid may be located on a surface of the heap, or within the heap, or a combination of both locations may be employed. The irrigation grid may be used directly on an established heap, or in combination with an agglomeration technique.

The irrigation grid may be of any suitable kind and the invention is not limited in this respect. By way of example the irrigation grid may include a reticulated network of pipes, sprays and the like located on a surface of the heap, or within the heap, or both.

The heap leach process may be carried out under ambient conditions i.e. at temperature and atmospheric pressure conditions prevailing at the heap.

The leaching method may be carried out for a period of at least 50 days, such as at least 100 days. In one embodiment, the leaching method may be carried out for a period of at least 450 days. In another embodiment, the leaching method may be carried out for a period of up to 600 days. The duration of the leaching method is determined by a number of factors, such as the time to complete mineral oxidation.

During the active leach cycle, the ore in the heap may be irrigated with a solution. The subsequently-leached metals, e.g. copper and/or uranium and/or gold, may thereafter be recovered using any suitable process e.g. a solvent extraction process.

Optionally, hydrochloric acid may be added to the leach liquor. The hydrochloric acid may be utilised as a cleaning agent for the irrigation drippers.

The leach liquor may contain copper, iron and other anion and cation species that may originate from recycled process water drawn from the heap, or which may have dissolved from the ore which is being treated.

In one embodiment of the process, the pregnant leach solution contains copper and uranium. In another embodiment, the pregnant leach solution may also contain precious metal.

The pregnant leach solution may be pretreated to adjust solution chemistry prior to extraction of the target metal/s therefrom.

The pretreatment of the pregnant leach solution may comprise reduction of solution redox potential. Reducing solution potential may be advantageous in the subsequent extraction of uranium (such as by solvent extraction). The reduction in solution redox potential may be achieved by reducing the ferric ion concentration in solution. Ferric ion reduction may be conveniently achieved by contacting the pregnant leach solution with ferric consuming material, eg ore minerals such as metal sulphides. The contact with ferric consuming material may be in the absence of an oxidant. For example, the pregnant leach solution may be contacted with metal sulphides in the absence of an oxidising gas. The metal sulphides may be provided in a heap which is not under forced aeration.

The pretreatment may alternatively or additionally comprise consumption of at least some acid. Acid consumption (neutralisation) may be of assistance in the subsequent extraction of copper (such as by solvent extraction). Neutralisation may be achieved by contacting the pregnant leach solution with acid consuming materials, such as acid consuming ores and gangue. Also, acid can be consumed in the above described reaction of ferric ion with metal sulphides. Accordingly, neutralisation may occur simultaneously with reduction in solution potential.

The pretreated pregnant leach solution can then be subjected to solvent extraction to recover one or more target metals.

In another aspect, there is disclosed a method of recovering one or more of a base metal, uranium and a precious metal from an ore wherein the ore is subjected to an active leach cycle in which the ore is contacted with an iron containing acidic leach liquor having a high chloride content in the presence of an oxygen containing gas, wherein:
a. the ore is optionally agglomerated;
b. the solution potential of the leach liquor exceeds 450 mV Ag/AgCl, in the absence of microorganisms;
c. the total iron concentration of the leach liquor contacting the ore is >0.1 g/L;
d. the final ore moisture content is optionally in the range 2 to 25 wt. %;
e. the pH of the leach liquor does not exceed pH 3.5; and
f. the Cl— ion concentration of the leach liquor contacting the ore is between 20 and 230 g/L.

In a further aspect, there is disclosed a process of extracting one or more of a base metal, uranium and a precious metal from an ore material which is enhanced at solution potentials exceeding 450 mV Ag/AgCl, in the absence of any microorganism, by contacting the ore material in an active leach cycle using an acid solution at a high chloride content containing dissolved iron.

It has been found that operation of the uranium solvent extraction (USX) process may be adversely affected under high chloride and/or high ferric ion concentrations. Accordingly, in a modification of the present disclosure, the process may include a pretreatment step in which the ore material is treated with a solution having either lower chloride concentration or lower solution potential, or both, as compared with the high chloride, acidic leach liquor discussed above. The solution used in the pretreatment step will be hereinafter referred to as a "pre-leach" solution, although it is to be appreciated that leaching of the ore material still occurs during the pretreatment step. It has been found that a substantial amount of uranium, and at least some base metal, may be leached during the pretreatment step.

Low Redox Modification

In a first modification of the process, the pretreatment step comprises treatment of the ore material with a pre-leach solution having a relatively low solution redox potential. This modification may be effected by treatment of at least a portion of the ore material with an acidic leaching solution in the presence of no or reduced oxidant. For example, the pretreatment may be conducted under no or reduced aeration of the leach solution. The pre-leach solution may contain a high chloride content. The maximum chloride content may be 100 g/L, particularly if solvent extraction is used to recover dissolved uranium from the pregnant leach solution. As the pretreatment occurs near the beginning of the leach cycle, the ore material includes a substantial amount of unreacted sulphide minerals. These sulphide minerals react with the ferric ions in the leach solution, converting them to ferrous ions. However, the lack of oxidant (eg, aeration) means there is no subsequent conversion of the ferrous back to ferric ions. Depending on the acid demand of the ore material, this embodiment may result in a high concentration of dissolved salts from the acid gangue reactions, which may in turn result in oversaturation of those salts and precipitates to accumulate in the heap. This can lead to poor permeability to the point in some cases of process failure. The salt precipitates predominantly comprise sodium iron sulphates, such as metasideronatrite ($Na_4Fe_2(SO_4)_4(OH)_2.3H_2O$). The precipitates may also comprise gypsum and other minor salts.

In order to ameliorate the problem of precipitation in the heap in the first embodiment of the modified process, additional salt may be added to process solutions in order to force the precipitation of oversaturated salts such as metasideronatrite prior to its use as the preleach solution. In addition, a purge of process liquors would be required in order to keep overall salinities of process liquors within acceptable limits. The first embodiment may therefore require a facility for the addition of salt and the precipitation of metasideronatrite, which is likely to be large and costly. Another potential disadvantage is that the pretreatment step, being deliberately oxidant-poor, is not an efficient copper leach sector. As the duration of the pretreatment step may extend for a significant period of time- eg, up to 150 days, this may result in significant delay before commencement of substantive copper recovery.

Low Chloride Modification

In a second modification of the process, the pretreatment step comprises treatment of the ore material with a pre-leach solution having a relatively low chloride content, as compared with the high chloride, acidic leach liquor. Accordingly, in this embodiment, it would not be appropriate to add salt to the ore material during or post agglomeration.

This modification may be effected by treatment of at least a portion of the ore material with a low (or no) chloride containing acidic leaching solution in the presence of an oxidant. The chloride content will depend on the source/s of the process solutions used. The chloride content may range up to 80 g/L, such as up to 70 g/L. In an embodiment, the chloride content may range up to 50 g/L. In an embodiment, the chloride content may range up to 45 g/L. In another embodiment, chloride content may range up to 35 g/L. The average chloride content may range from 5 to 45 g/L, such as from 25 to 35 g/L.

The pre-leach solution may be aerated during the pretreatment step.

The solution redox potential of the pre-leach solution may be less than 450 mV Ag/AgCl. In an embodiment, the solution redox potential of the pre-leach solution may be less than 440 mV Ag/AgCl. In an embodiment, the solution redox potential of the pre-leach solution may be less than 430 mV Ag/AgCl. In an embodiment, the solution redox potential of the pre-leach solution may be less than 420 mV Ag/AgCl. The solution redox potential may be greater than 390 mV Ag/AgCl. In an embodiment, the solution redox potential of the pre-leach solution may be greater than 400 mV Ag/AgCl. In an embodiment, the solution redox potential of the pre-leach solution may range from 390 to 420 mV Ag/AgCl. The pretreatment may be conducted for a period of time sufficient for at least the majority of uranium to be leached during this step. Moreover the majority of the gangue in the ore material reacts with the acid in the pre-leach solution resulting in a ripios that is depleted in such deleterious elements as iron, aluminium and calcium. There would also be partial leaching of base metals, eg copper, during the pretreatment step. The ripios from the pretreatment step is then subjected to the high chloride leach during which the chloride concentration in the leach solution is increased. The depletion in gangue in the pretreatment ripios means that there is less ferrous available to form salt precipitates, such as metasideronatrite, and therefore there is a reduced risk of heap blockage. The process liquor from the pretreatment step can be purged from the system and thus reduce dissolved solids loading in the subsequent hypersaline section. This can reduce precipitate formation and help ensure permeability can be maintained in the hypersaline section. Liquor transferring, if required, from the pre-leach to the hypersaline would be subjected to precipitation and removal of deleterious salts prior to transfer to the high chloride leach step. The high chloride leach is primarily focussed on leaching and recovery of copper, the salinity limitations on uranium solvent extraction are not a consideration and therefore, the salinity of the leaching solution can be increased as required to accommodate the ore mineralogy. There are two other benefits of this embodiment:

In the first embodiment in which the pretreatment step is conducted at high salinity, a purge may be required to maintain liquor permeability. This purge would contain high concentrations of chloride. This would lead to the need for increased addition of a chloride source such as NaCl to make up the loss. This would not be the case for the second embodiment where any purged liquor would have a relatively low chloride concentration.

Uranium solvent extraction is more efficient at lower chloride concentrations. This leads to a smaller uranium solvent extraction facility and hence lower capital and operating costs.

BRIEF DESCRIPTION OF THE DRAWINGS

The process is further described by way of example with reference to the accompanying drawings in which.

DESCRIPTION OF PREFERRED EMBODIMENTS

The method is described herein with reference to the use of a high chloride mediated, high solution potential, active heap leach cycle, for crushed or run-of-mine (ROM) ore (or ore concentrate).

An advantage of the disclosed method is to significantly increase the oxidation rate of sulphide minerals or mixed sulphide and oxide minerals during active heap irrigation, and thereby improve metal recovery in a shorter leach cycle and, additionally, to lower, at least to some extent, the operational cost of a heap leach.

Figure 1:
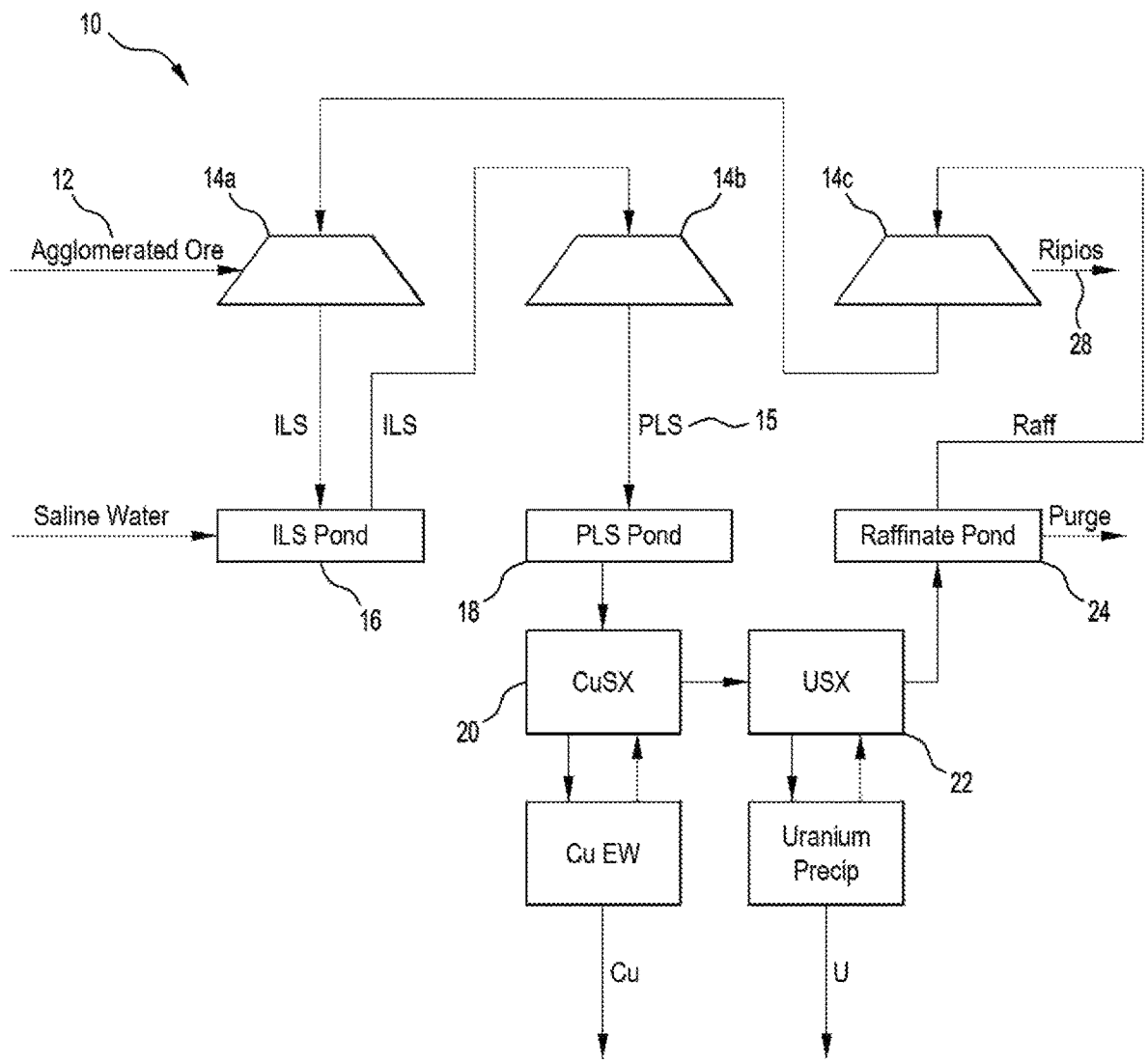
FIG. 1 illustrates in block diagram form a first embodiment of a flowsheet for the heap leaching of copper and uranium ore.
Figure 2:
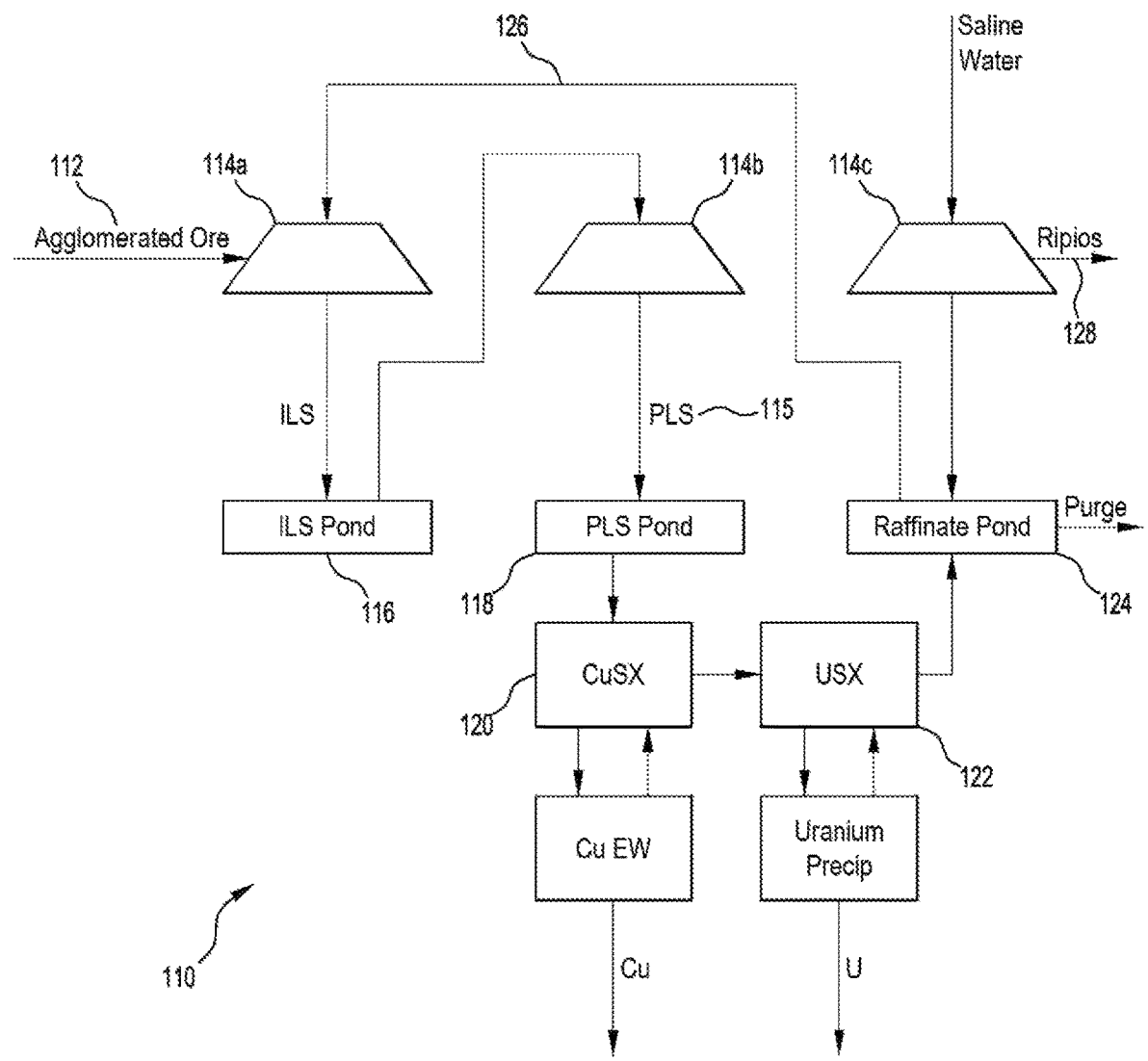
FIG. 2 illustrates in block diagram form a second embodiment of a flowsheet for the heap leaching of copper and uranium ore.

With reference to FIGS. 1 and 2, two flowsheet embodiments 10, 110 of the disclosed method are illustrated. In each embodiment, an ore that contained the following value minerals:

Copper sulphides mostly in the form of chalcopyrite, bornite and chalcocite, but may include other copper sulphide species;

Uranium in the form of uraninite, coffinite and brannerite; and

Gold, was crushed to a size distribution in the range P80 of 6 to 25 mm. Optimally, the size distribution was between 8 and 12 mm.

The crushed ore was agglomerated 12, 112 with a combination of process solution (heap leach raffinate liquor) and concentrated sulphuric acid. The concentrated sulphuric acid was added at a concentration in the range of 0 to approximately 20 kg/tonne of ore. The optimal addition was in the range of 6 to 12 kg/ton ore. The raffinate liquor was added (as required) to give a final moisture of around 3.5% (which was preferred for agglomerate formation).

Solid salt selected from one or more of the following: NaCl, $MgCl_2$, KCl and $AlCl_3$, was added to the ore during or post agglomeration as required to tailor the ultimate chloride concentration of the leach liquor. It was preferred to add the salt to the ore as opposed to adding it directly to the solution irrigated in the heap as the salt was then dissolved in situ and the heap acted as a fines filter for any insoluble impurities.

Salt was added onto the agglomerate conveyor.

The agglomerated ore was stacked in heaps, 14a, b, c and 114a, b, c on either multilift non-reusable pad or on a reusable pad (not shown). While diagrammatically each heap is shown as separate units a, b, and c, in practice these units are usually continuously stacked. The ripios may be removed after heap leaching and transferred to a ripios dump for storage and potentially extra Cu recovery from long term permeate collection.

Each heap unit 14a, b, c and 114a, b, c is irrigated at flux of 5-20 $l/m^2/h$ with an optimum of between 8-15 $l/m^2/h$.

Concentrated sulphuric acid is added to the solution irrigated to each heap unit to achieve a desired concentration of acid in the discharge. This is usually a minimum to minimize overall process acid consumption.

The acid reacts with gangue minerals in each heap unit to produce ferrous ions from minerals such as siderite and chlorite. Some ferric ions may be derived from acid reaction with hematite.

The ferrous ions are converted to ferric ions by oxidation with oxygen. Oxygen is supplied into the heap by blowing air into the heap.

The acid and ferric ions react with copper sulphide minerals in the ore to release copper sulphate into solution with the ferric consequentially reduced to ferrous ions. An equivalent reaction occurs between acid, ferric ions and uranium minerals in order to release uranium into solution. Under some conditions, an equivalent reaction occurs to release precious metal, especially gold, into solution. In each case, the ferrous ions generated are re-oxidized to ferric ions by oxygen.

In each of FIGS. 1 and 2, the intermediate leach solution (ILS) produced by heap units 14a and 114a reports to an ILS pond 16, 116. It is then applied to the heap units 14b and 114b, respectively to produce the final pregnant leach solution (PLS) 15, 115 which report to the PLS ponds 18, 118, respectively.

Copper and uranium are recovered from the PLS 15, 115 through independent copper (CuSX) and uranium (USX) solvent extraction processes, 20, 120 and 22, 122, respectively.

In FIG. 1, the raffinate from the USX process reports to the heap leach unit 14c as a process solution. The leachate arising from the heap leach unit 14c reports to the heap leach unit 14a as a process solution. Saline water is added to the ILS in the ILS pond 16.

In FIG. 2, the raffinate from the USX process and the leachate arising from the heap leach unit 114c both report to the raffinate pond 124. Raffinate 126 from the raffinate pond 124 then reports to heap leach unit 114a as a process solution. Saline water is added to the heap leach unit 114c.

In FIG. 1 the ripios 28 is not washed for any other use. In FIG. 2 the ripios is washed in preparation for milling and floating residual sulphide as well as gold. The process in FIG. 2 may accordingly require a greater raffinate purge to control ions such as Fe, Al and $SO_4^{-2}$ because of the wash stage.

While FIGS. 1 and 2 illustrate two flowsheet embodiments, it is to be understood that there may be a variety of configurations of the same unit operations that could be considered.

Figure 3:
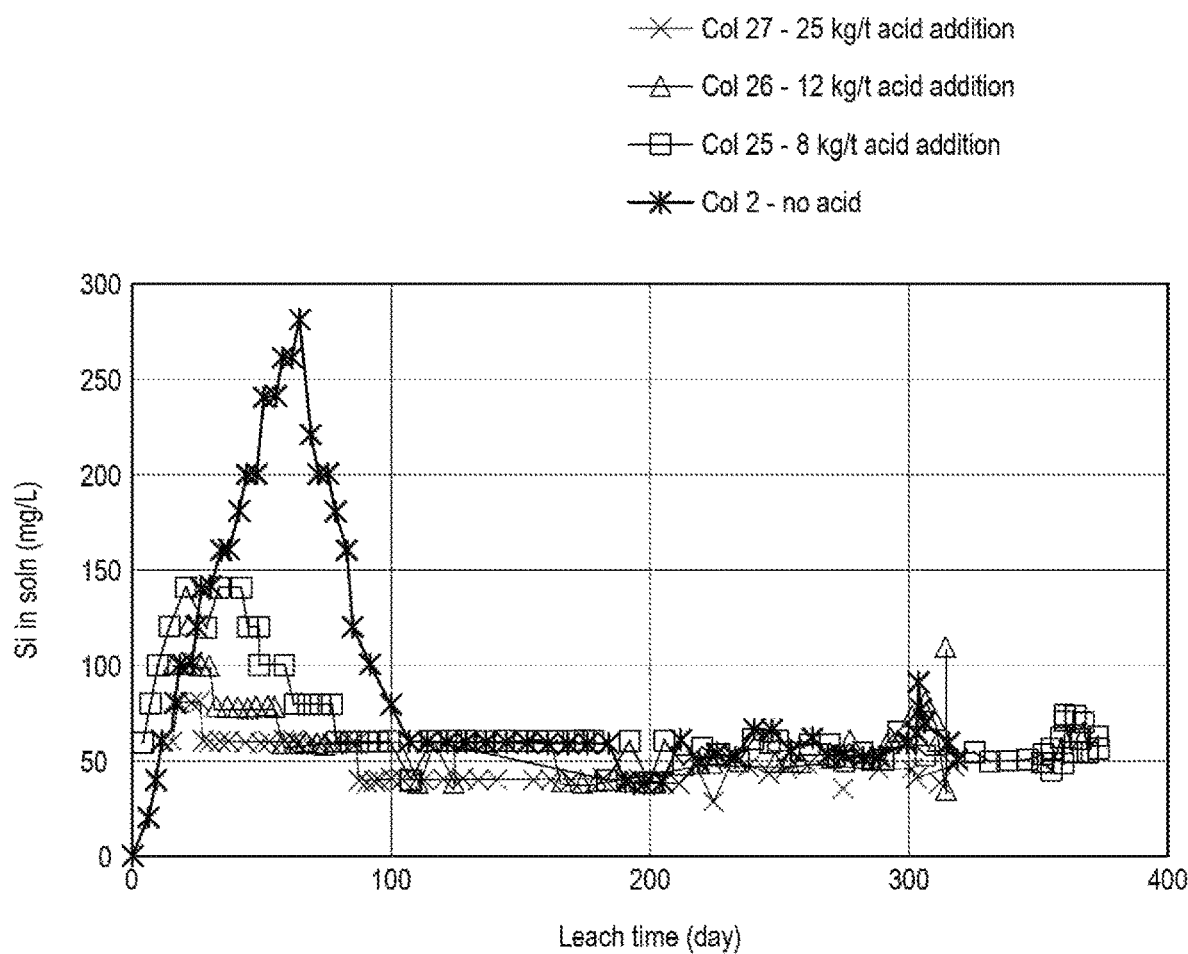
FIG. 3 is a graph of dissolved silica concentration (mg/L) versus leach time (days) for different amounts of concentrated sulphuric acid added during ore agglomeration. Stars=no acid; squares=8 kg/ton acid; triangles=12 kg/ton acid; crosses=25 kg/ton acid.

Referring now to FIG. 3, the amount of soluble silica as a function of leach time is shown for different additions of concentrated sulphuric acid during agglomeration. While increased acid addition has not shown to have process improvements in regard to extent of uranium or copper dissolution, there are process improvements arising from reduced silica levels in solution. Solubilized silica becomes problematic as it preferentially precipitates at the surface of the heaps and can cause permeability problems. It is removed from solution by the addition of poly ethyl glycol (PEG) to the part of the first stage leachate. It is preferential to minimize it from the start. The precipitated silica from PEG addition is settled in a clarifier and recycled to agglomeration as a method of disposal.

Figure 4:
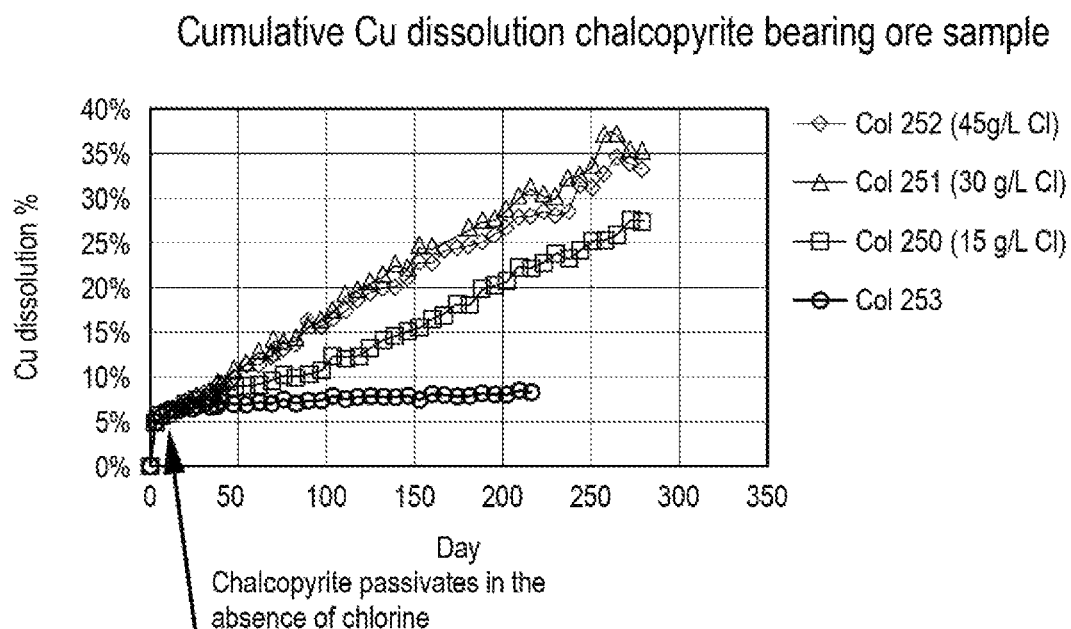
FIG. 4 is a graph showing Cu dissolution (ie, mass Cu dissolved/mass Cu in sample, expressed as percent) versus time (days) for different concentrations of chloride in leach liquor. Circle=no chloride; square=15 g/L chloride; diamond=30 g/L chloride; triangle=45 g/L chloride.
Figure 5:
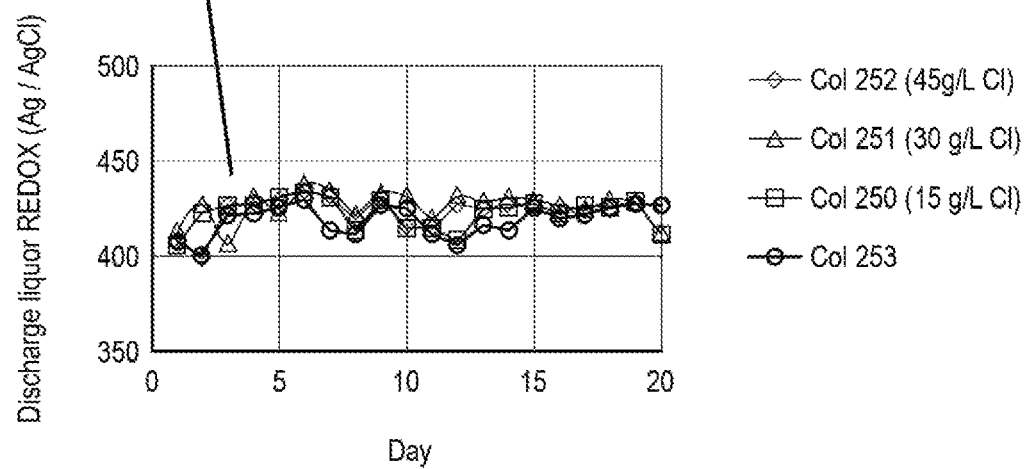
FIG. 5 shows discharge liquor (such as pregnant leach solution, or an intermediate leach solution) redox potential (mV (Ag/AgCl)) versus time for the same chloride concentrations. Circle=no chloride; square=15 g/L chloride; diamond=30 g/L chloride; triangle=45 g/L chloride.

FIG. 4 is a graph showing Cu dissolution % versus time (days) for different concentrations of chloride in leach liquor. FIG. 5 shows discharge liquor redox potential (mV (Ag/AgCl)) versus time for the same chloride concentrations. FIGS. 4 & 5 showing that chalcopyrite leaching passivates in the absence of chloride above 420 mV (Ag/AgCl). However this is not the case when the chloride in solution is at or above 15 g/L. This indicates that the passivation point is extended in the presence of chloride.

Figure 6:
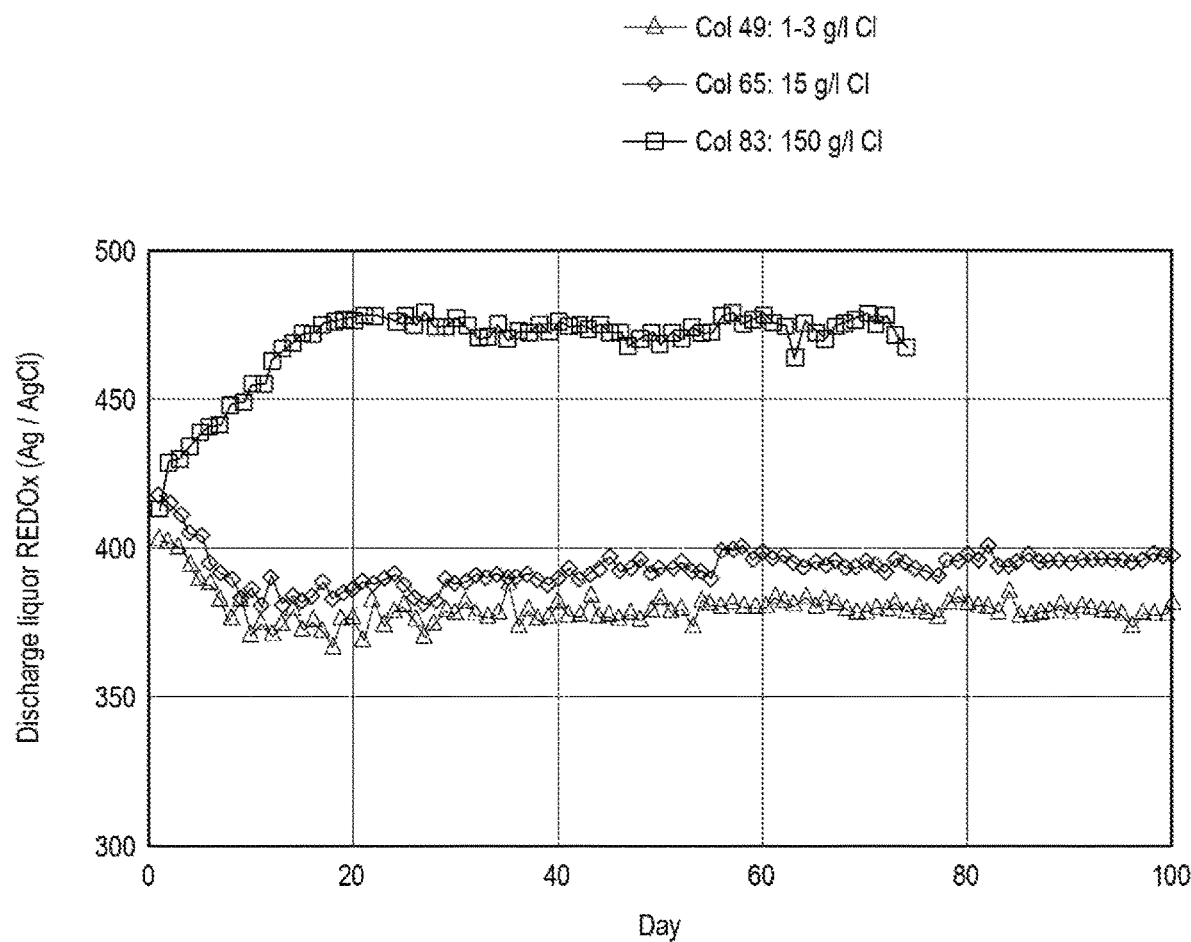
FIG. 6 is a plot of the discharge liquor redox potential (mV (Ag/AgCl)) versus time (days) for three different solution chloride concentrations: triangles=1-3 g/L, diamonds=15 g/L and squares=150 g/L.

FIG. 6 is a plot of the discharge liquor redox potential (mV (Ag/AgCl)) versus time (days) for three different solution chloride concentrations: 1-3 g/L, 15 g/L and 150 g/L.

Figure 7:
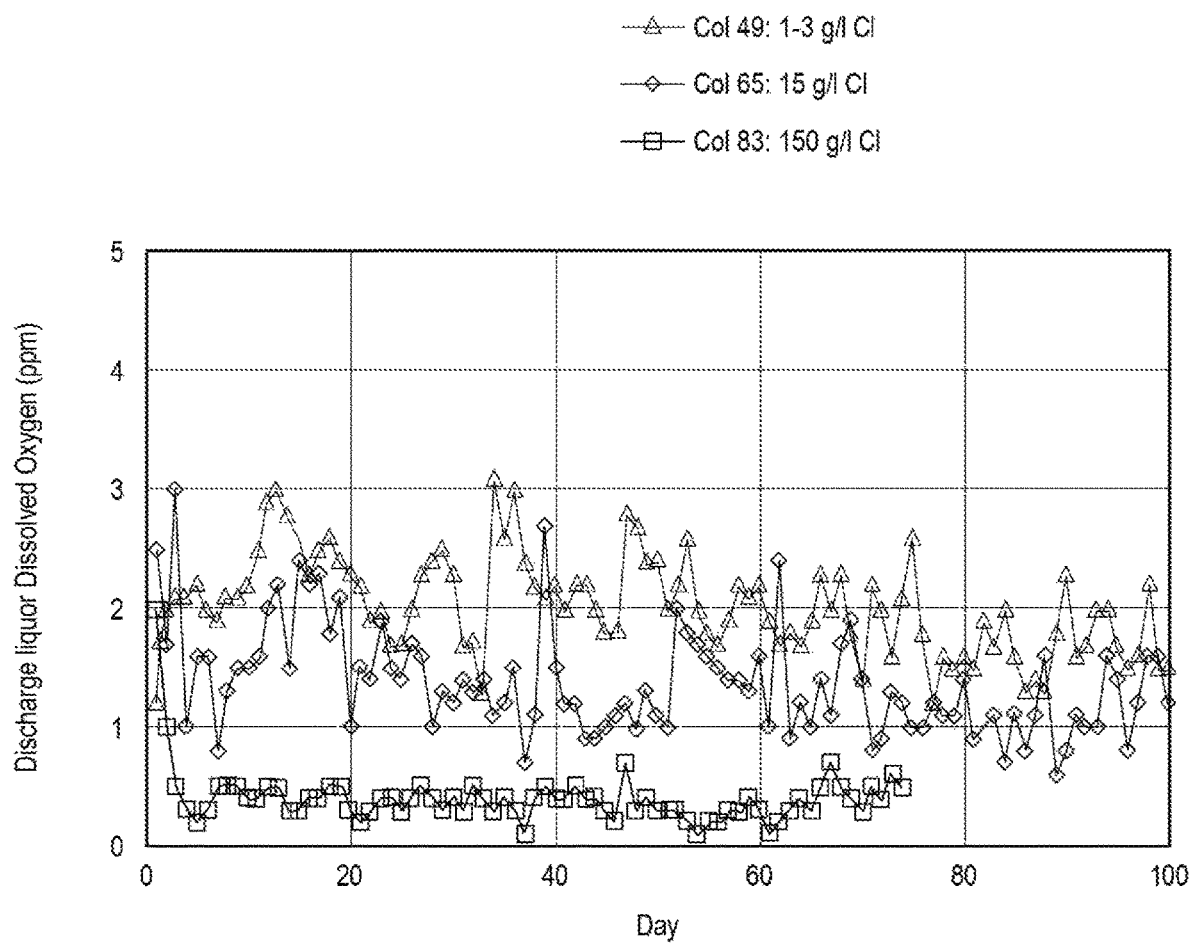
FIG. 7 is a graph of the Dissolved Oxygen (DO-ppm) in discharge liquor versus time for the same chloride concentrations as in FIG. 6: triangles=1-3 g/L, diamonds=15 g/L and squares=150 g/L.

FIG. 7 is a graph of the DO (ppm) in discharge liquor versus time for the same chloride concentrations. FIG. 6 shows that the rate of ferrous to ferric oxidation by air is enhanced in the presence of chloride and so the overall process equilibrates at higher REDOX potentials. This is also evident in the decreased dissolved oxygen in the discharge liquor arising from the increased rate of ferric oxidation (FIG. 7).

Figure 8:
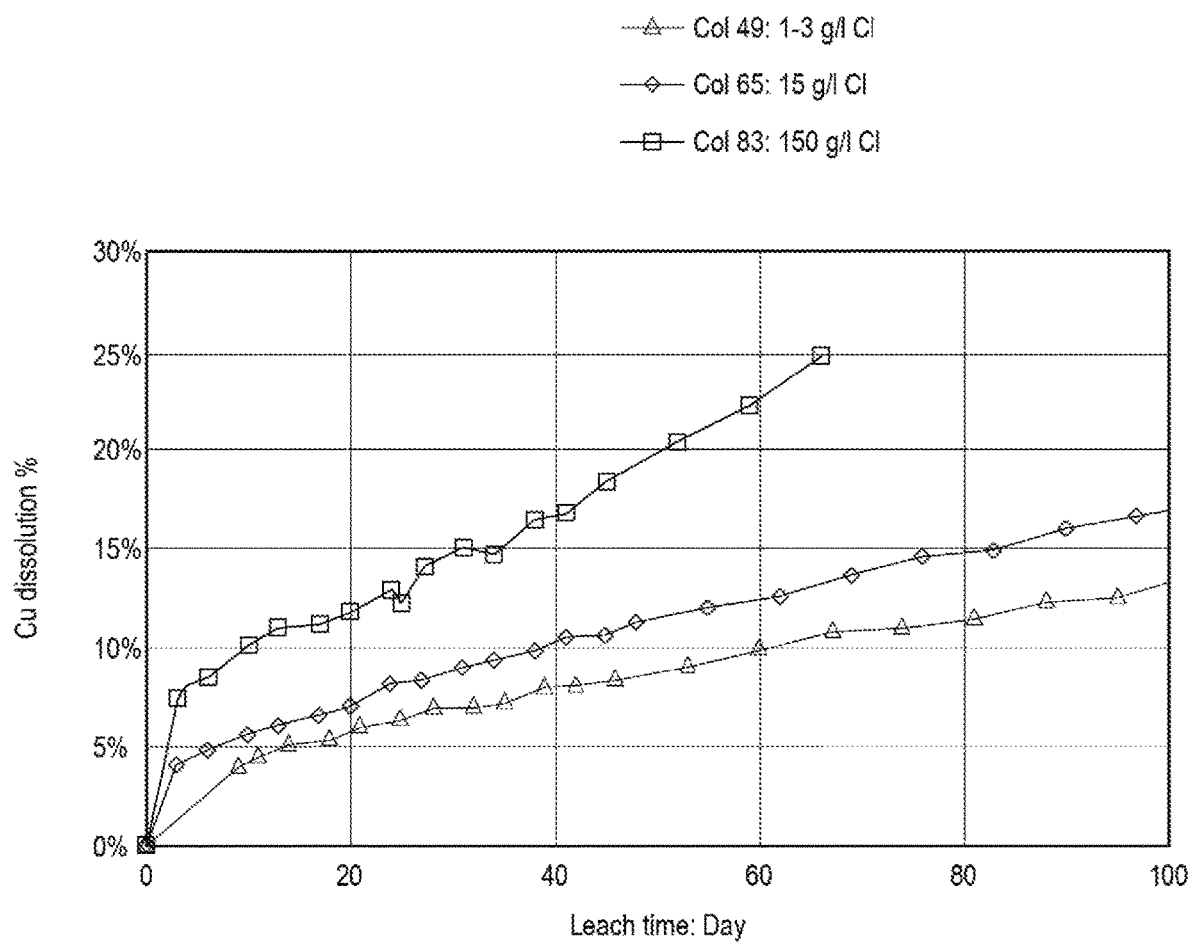
FIG. 8 is a graph showing Cu dissolution (ie, mass Cu dissolved/mass Cu in sample, expressed as percent) of predominantly chalcopyrite ore versus time (days) for three different chloride concentrations: triangles=1-3 g/L, diamonds=15 g/L and squares=150 g/L.
Figure 9:
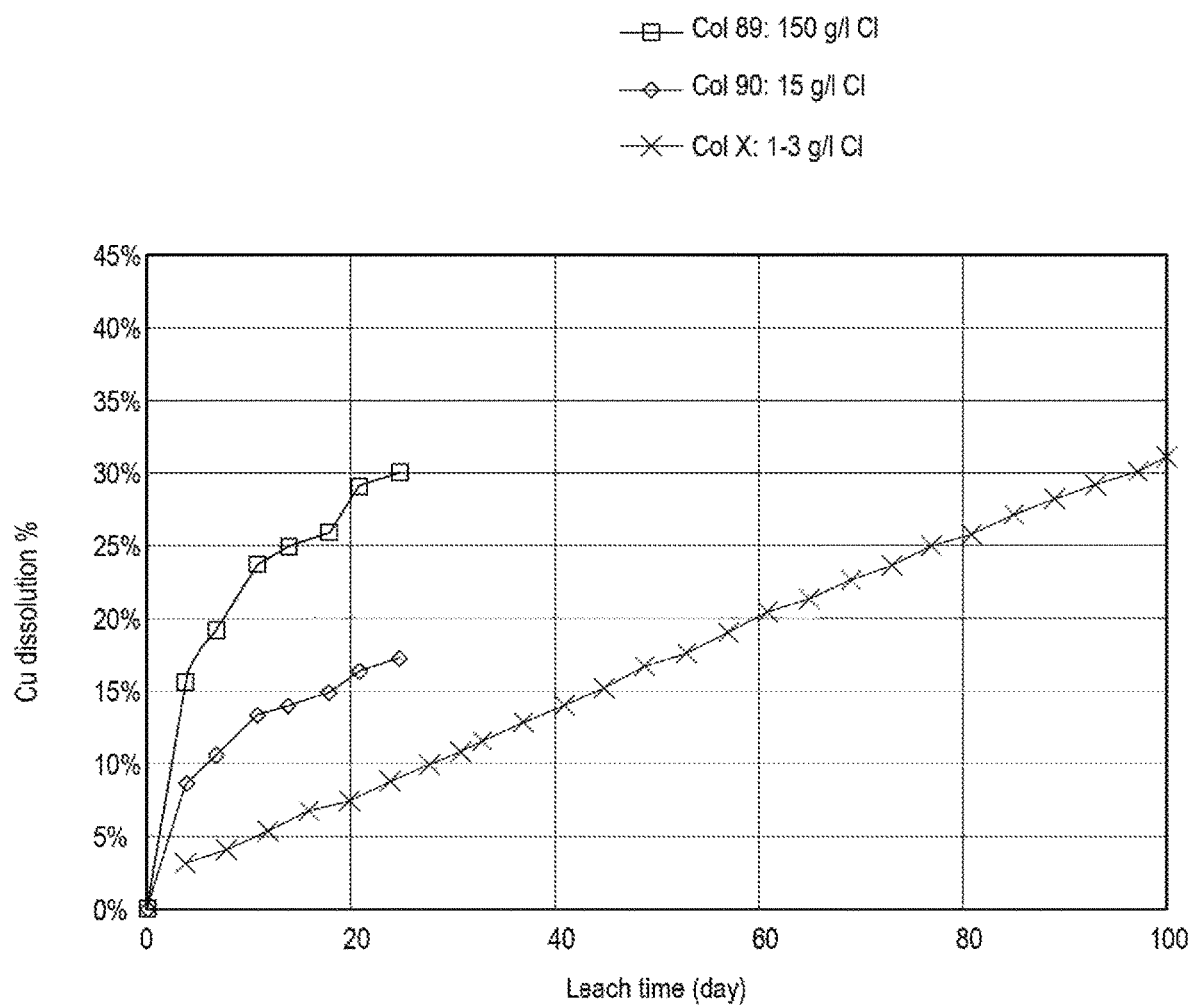
FIG. 9 is a graph showing Cu dissolution (ie, mass Cu dissolved/mass Cu in sample, expressed as percent) bornite/chalcocite ore versus time (days) for three different chloride concentrations: crosses=1-3 g/L, diamonds=15 g/L and squares=150 g/L.

FIG. 8 is a graph showing Cu dissolution (weight percent) of predominantly chalcopyrite ore versus time (days) for three different chloride concentrations 1-3 g/L, 15 g/L and 150 g/L. FIG. 9 is a similar graph showing Cu dissolution for bornite/chalcocite ore. It can be seen that copper sulphide minerals dissolution rates increase as a function of increasing redox.

Figure 10:
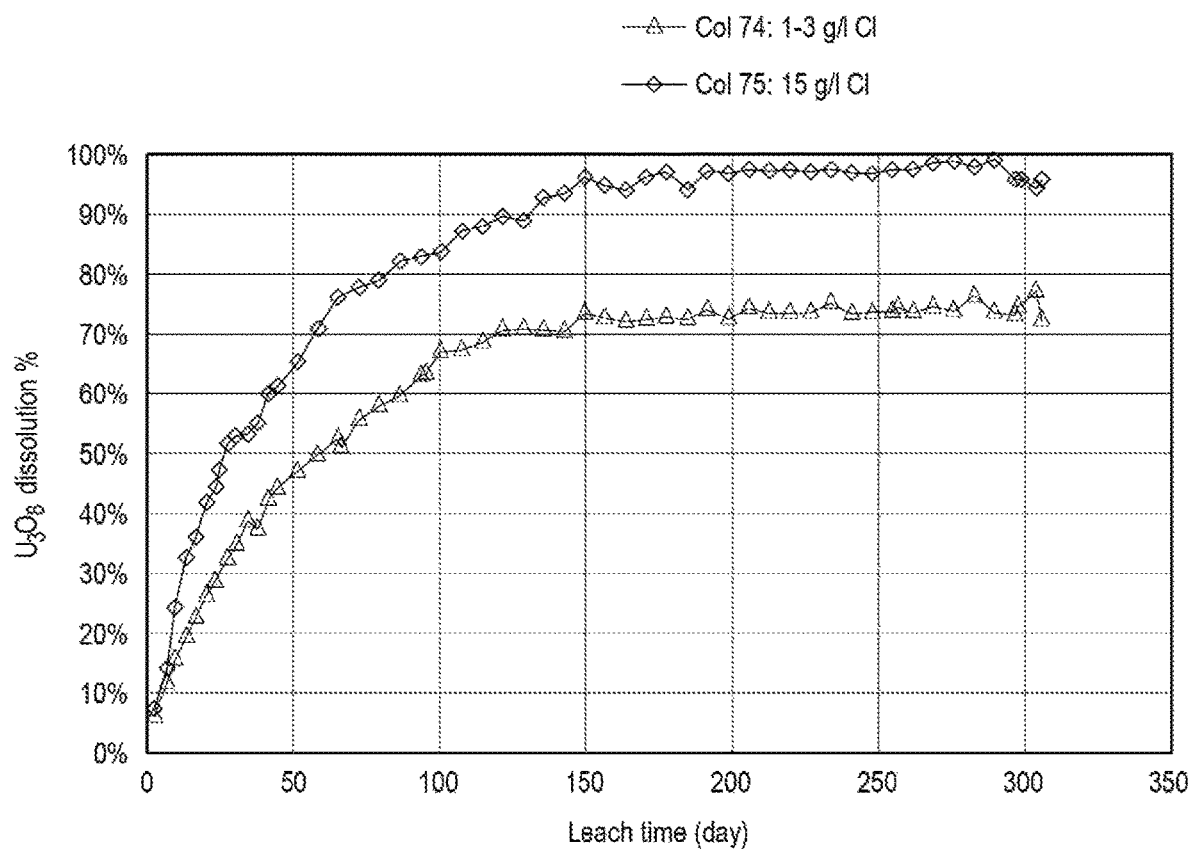
FIG. 10 is a graph showing uraninite dissolution (ie, mass U dissolved/mass U in sample, expressed as percent) versus time (days) for chloride concentrations of 1-3 g/L (triangles) and 15 g/L (diamonds).

FIG. 10 is a graph showing uraninite dissolution % versus time (days) for chloride concentrations of 1-3 g/L and 15 g/L. It can be seen that uranium mineral leach extents can also be increased by higher chloride concentration resulting in increased solution RED OX potential.

Figure 13:
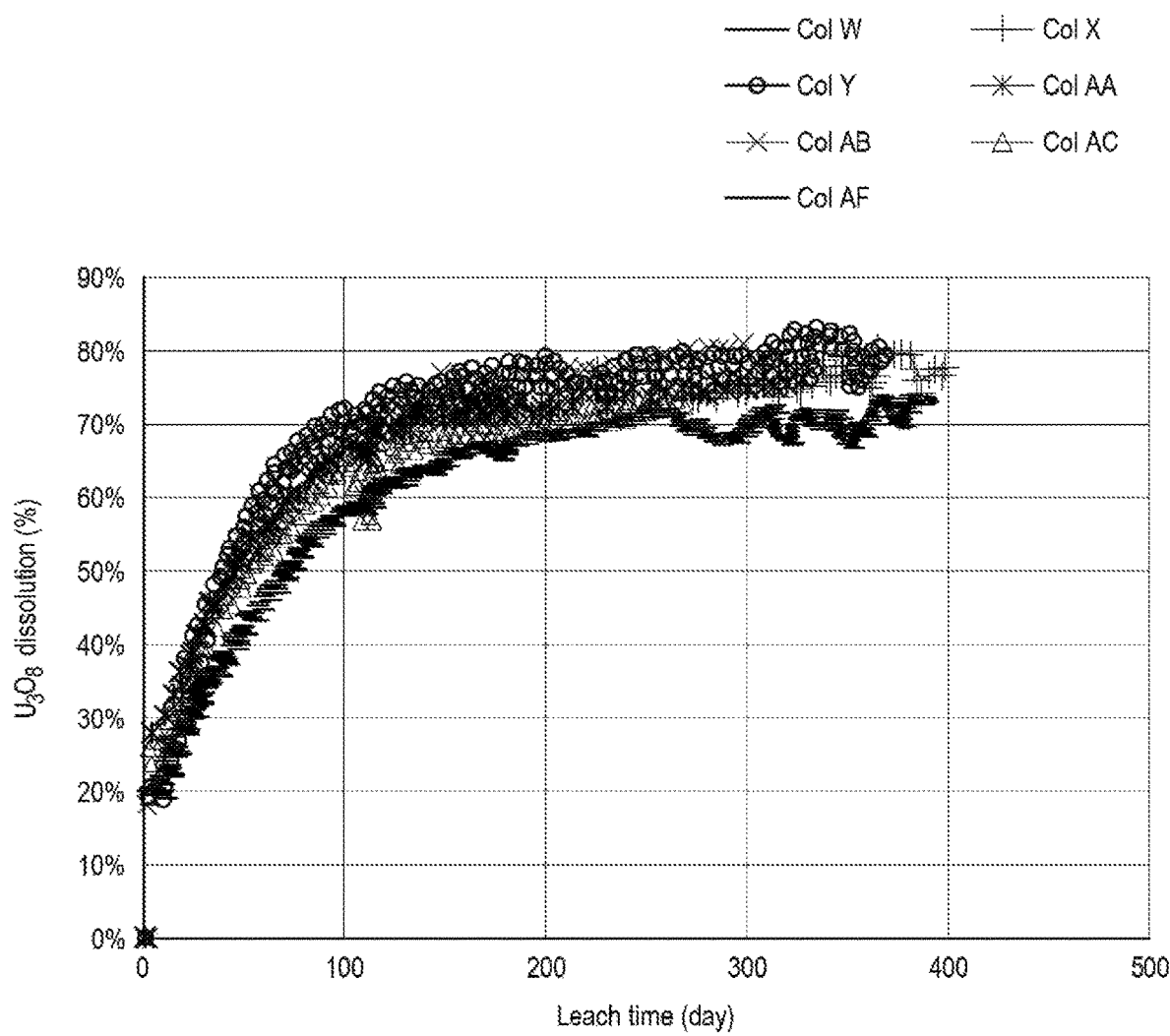
FIG. 13 is a graph showing % dissolution of uranium (as $U_3O_8$) versus time (days) for a chloride leach of uranium ore.
Figure 14:
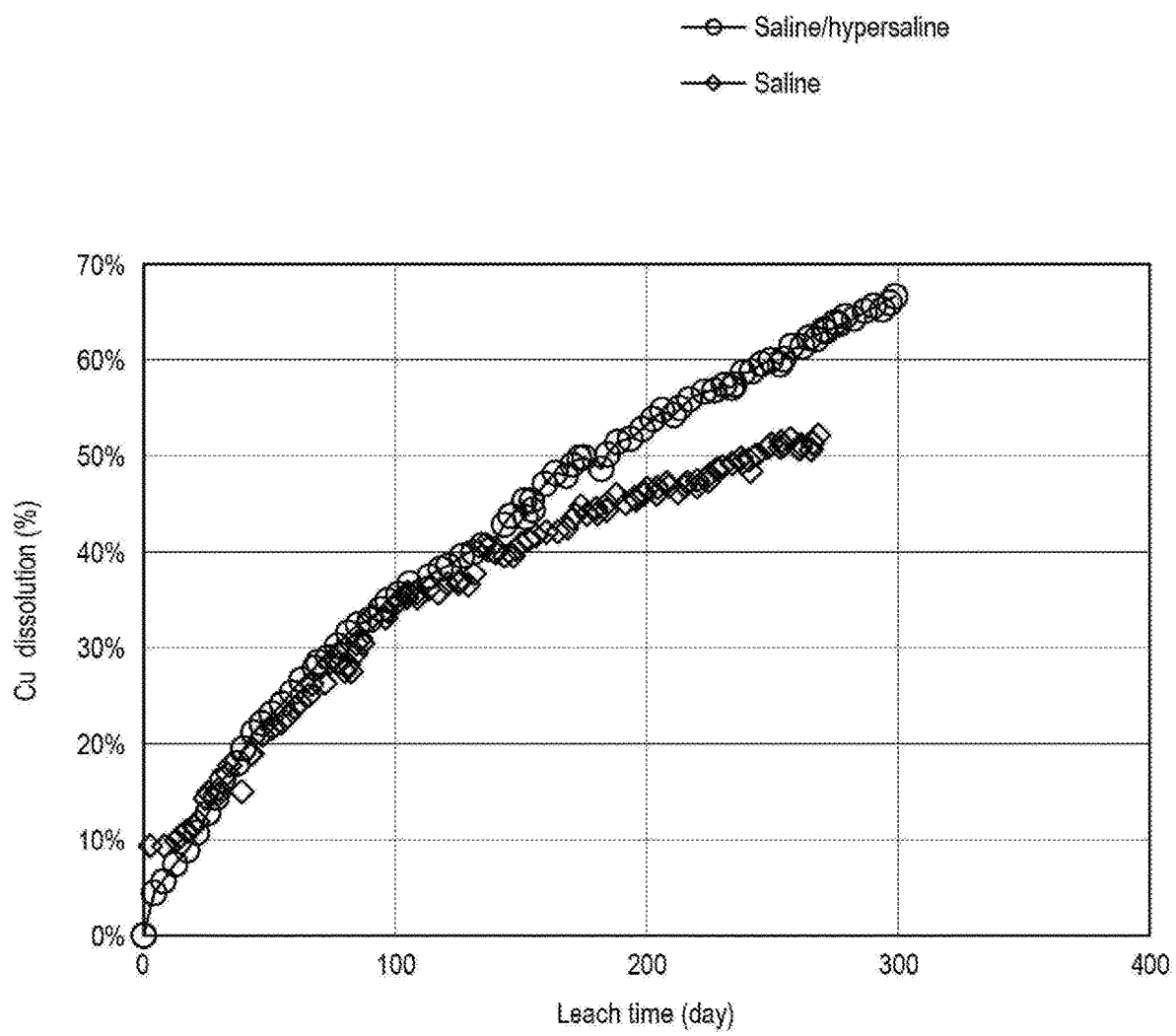
FIG. 14 is a graph showing % dissolution of copper versus time (days) for a chloride leach of copper ore.

FIG. 13 shows the % dissolution of uranium versus time (days) for leaching uranium ores at varying chloride concentrations commencing at 3 to 5 g/L, increasing to between 15 and 20 g/L, then increasing again to 100 g/L. It was found that once the salinity had increased to above 15 to 20 g/l, there was little effect on the amount of uranium dissolution. The data shows that for most leach conditions, irrespective of the salinity of leaching solution, the leach is essentially complete after approximately 100 to 150 days. In contrast, FIG. 14 shows that the rate of copper dissolution is significantly slower and that a minimum of 200 days is required to achieve maximum dissolution. The rate increase observed for many of the columns is due to the addition of salt to increase the salinity of the leach solution from 25 g/L (saline) to 100 g/L (hypersaline). It is evident that an increase in salinity results in an increase in copper dissolution.

Figure 15:
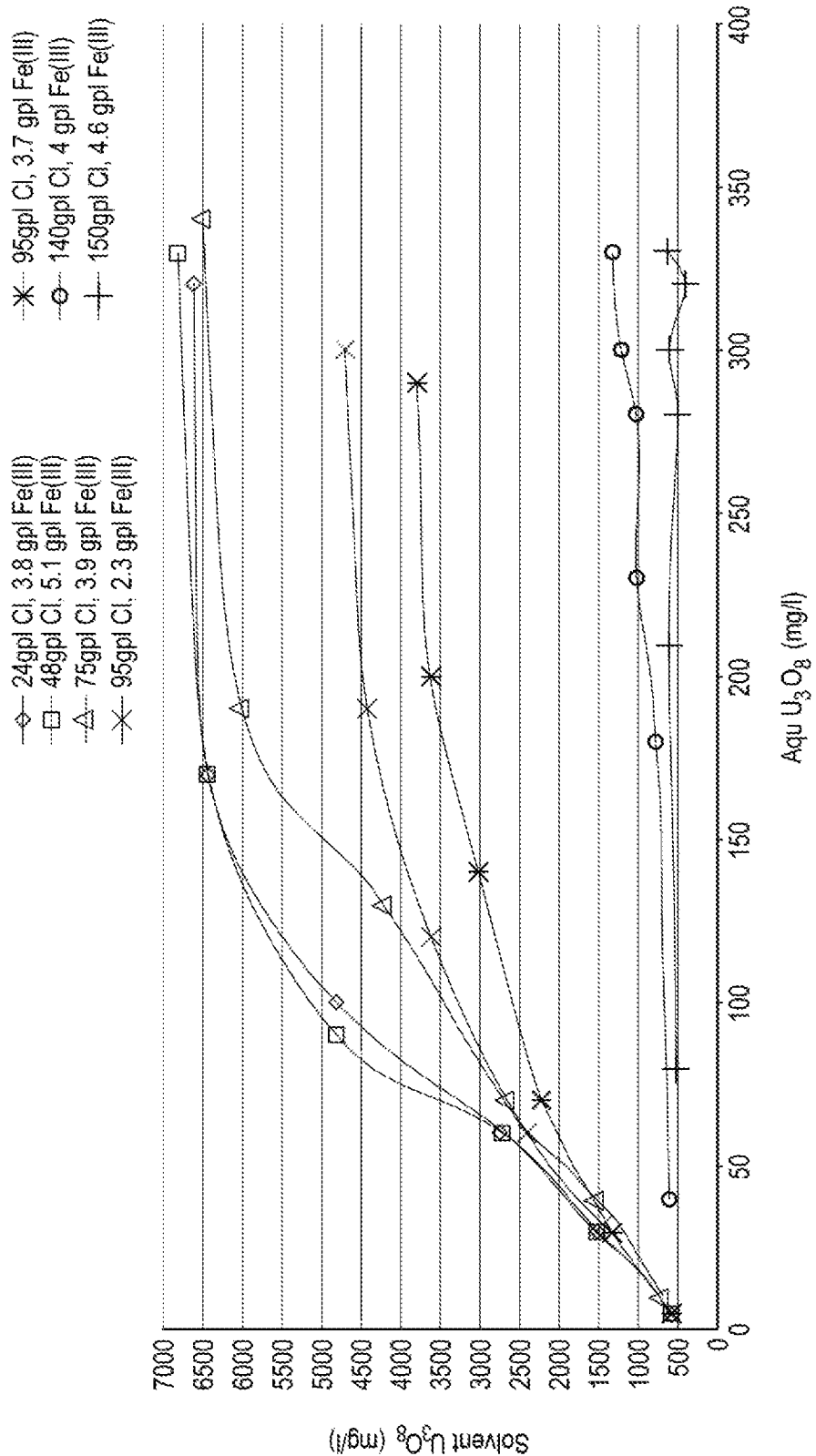
FIG. 15 is a graph showing the extraction of uranium into the solvent phase at low solution ORP for a range of chloride concentrations.
Figure 16:
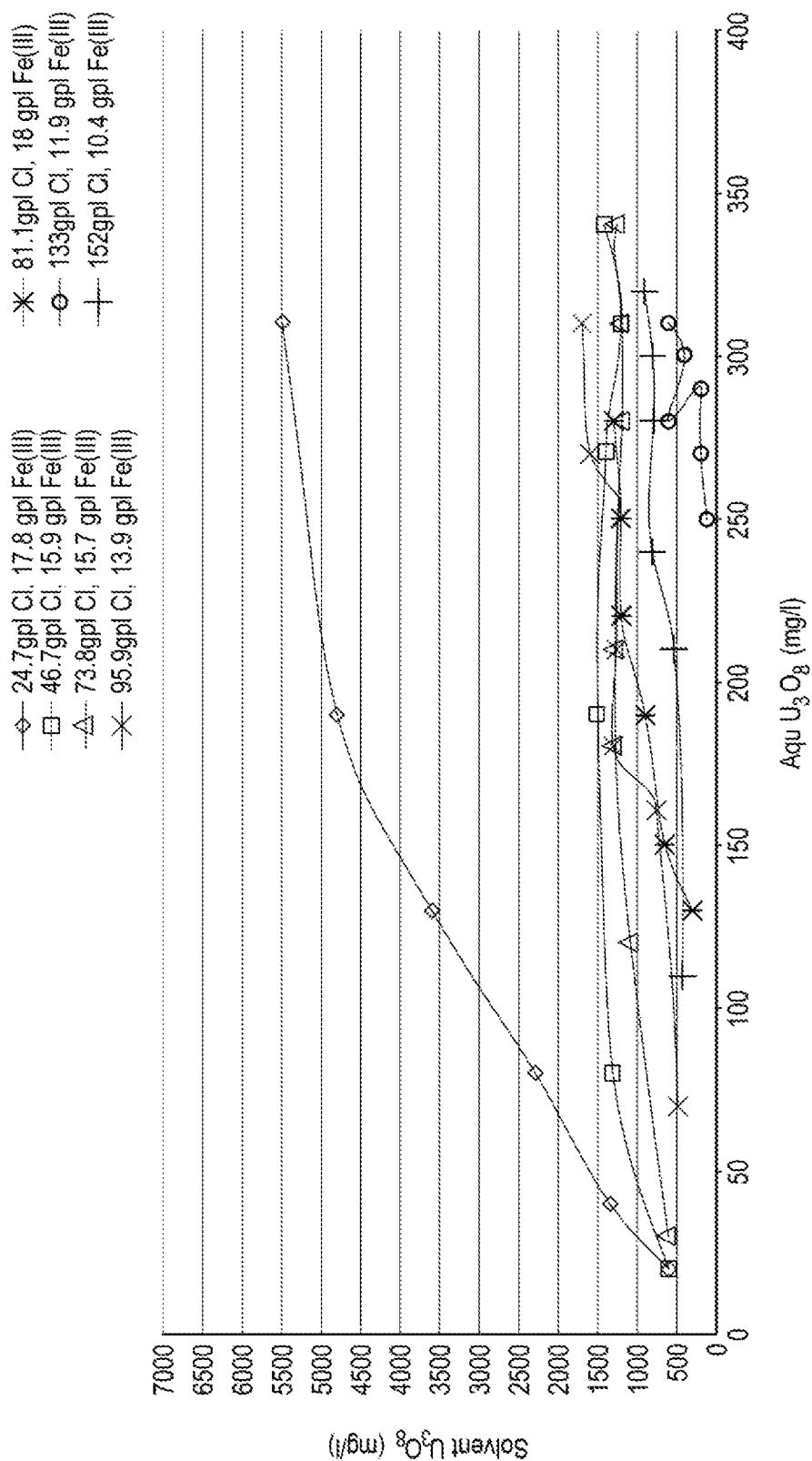
FIG. 16 is a graph showing the extraction of uranium into the solvent phase at high solution ORP for a range of chloride concentrations.

FIGS. 15 and 16 illustrate the effects of solution redox potential and salinity on extraction of uranium into the solvent phase during solvent extraction. At relatively low redox potentials (approximately 2 to 5 g/L ferric), FIG. 15 shows that the extraction of uranium is favoured at relatively low chloride concentrations, and steadily deteriorates as chloride concentration increases. FIG. 16 shows that under relatively high solution redox conditions (approx. 10 to 18 g/L ferric) uranium solvent extraction was poor for anything other than the lowest salinity (25 g/L). These graphs therefore demonstrate that high salinity and/or high solution redox adversely affect uranium solvent extraction. In the following embodiments, leaching of uranium is conducted under lowered solution redox or reduced salinity.

Figure 11:
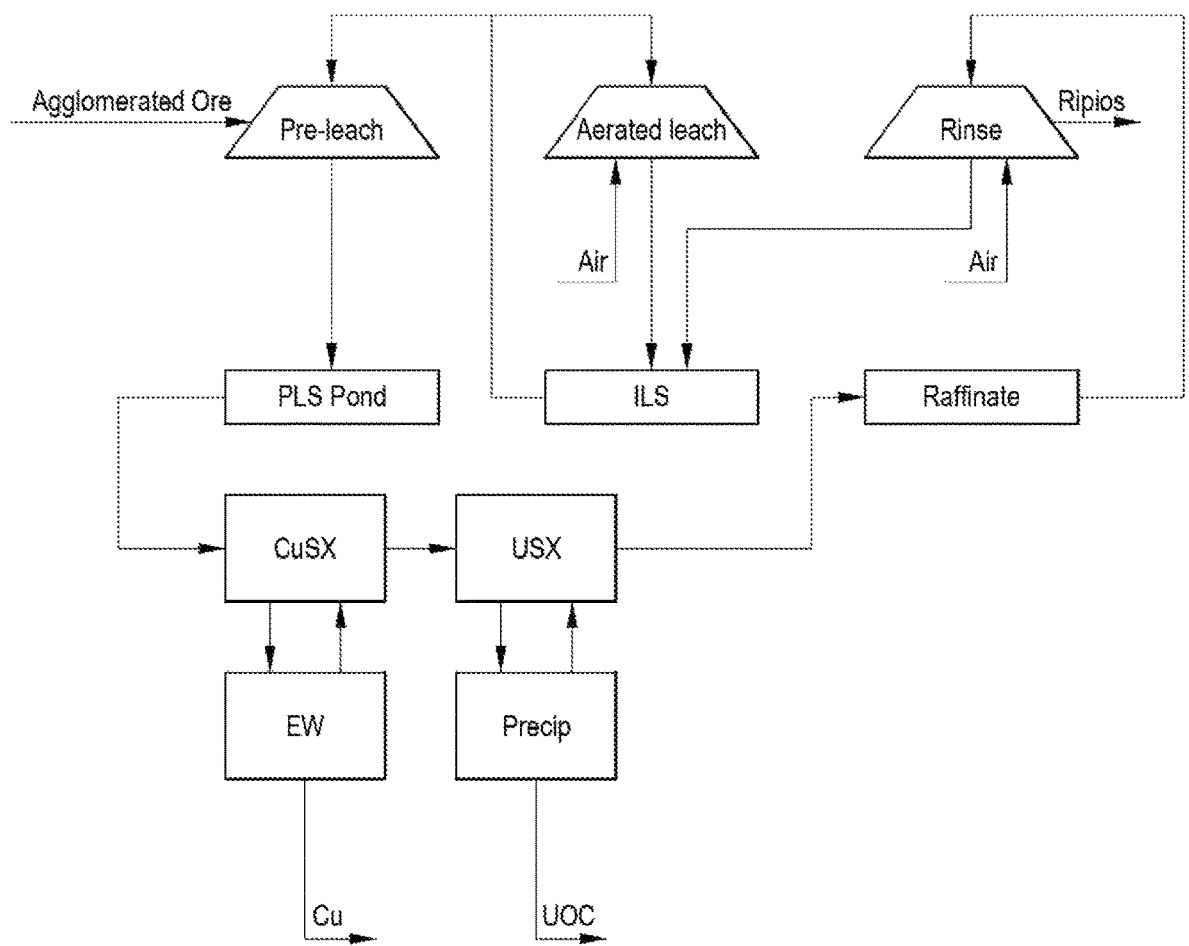
FIG. 11 illustrates in block diagram form a third embodiment of a flowsheet for the heap leaching of copper and uranium ore.

FIG. 11 illustrates in block diagram form a third embodiment 210 of a flowsheet for the heap leaching of copper and uranium ore, which is a first modification of the disclosed process that includes a low redox pretreatment step. This embodiment differs primarily from the previous embodiments in that the intermediate leach solution (ILS), 216, arising from an aerated heap leach reports to a "pre-leach" heap, 214b, containing acid and ferric consuming materials in the absence of forced aeration. The mineralogy of the pre-leach heap is similar to that of the other (aerated) heap/s, 214a, and primarily contains metal sulphides and uranium ore minerals. The ILS is contacted with the metal sulphides and acid consuming minerals in the pre-leach heap to reduce the ferric ion concentration and acid in solution. Reducing solution redox potential has been found to be advantageous in the subsequent extraction of uranium by solvent extraction. Acid consumption (neutralisation) has been found to be of assistance in the subsequent extraction of copper by solvent extraction.

The pretreated pregnant leach solution can then be subjected to solvent extraction to recover one or more target metals.

Figure 12:
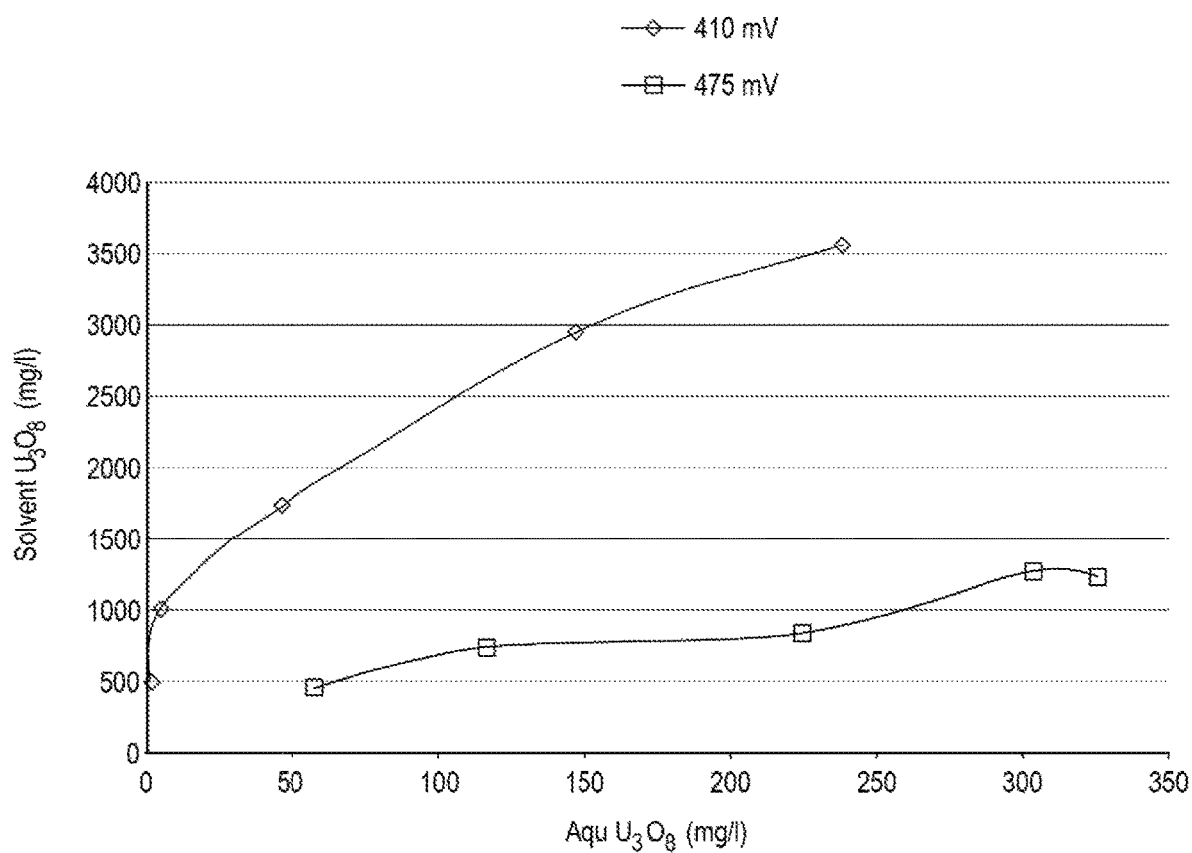
FIG. 12 is a graph showing the concentration of $U_3O_8$ (mg/L) extracted into solvent from a pregnant leach solution at two solution redox potentials: 475 mV (squares) and 410 mV (diamonds).

FIG. 12 is a graph showing the concentration of $U_3O_8$ (mg/L) extracted into solvent from a pregnant leach solution at two solution redox potentials: 475 mV (squares) and 410 mV (diamonds). This graph illustrates the advantage of reducing solution redox prior to subjecting the pregnant leach solution to uranium solvent extraction. As can be seen, the amount of uranium that loads onto the organic phase at 410 mV is more than 3 times that which loads at 475 mV. It is believed the significant difference is due to the much lower ferric present in the PLS at the lower redox- as uranium and ferric ion tend to coload onto the organic phase, the less ferric in solution, the more uranium can be loaded. The practical consequence of a higher uranium loading onto organic phase for a given uranium concentration in the PLS, is that the volume of required organic phase, and therefore the size of the required solvent extraction plant, can be correspondingly smaller, which is a saving in capital expenditure.

Figure 17:
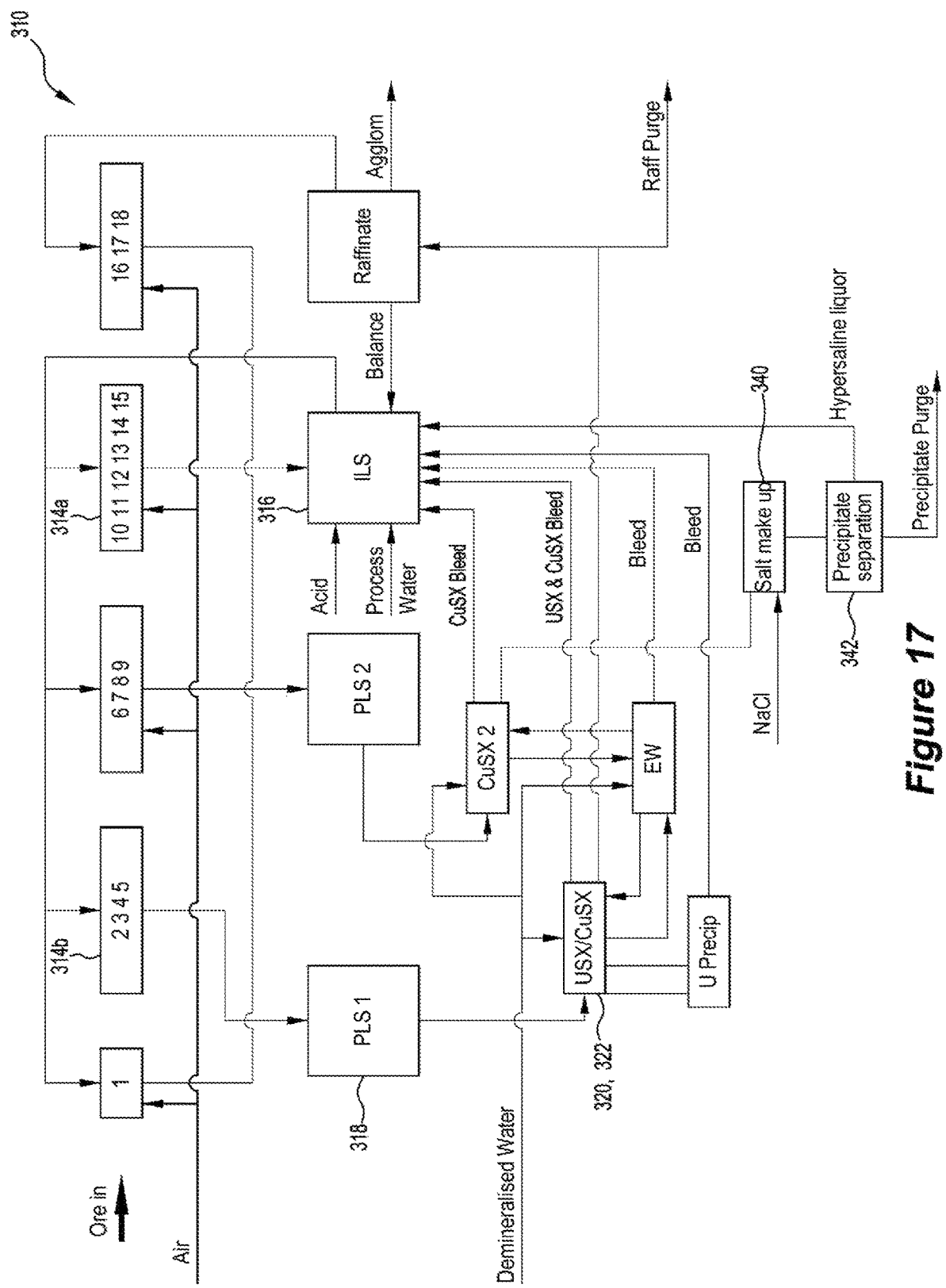
FIG. 17 illustrates in block diagram form a fourth embodiment of a flowsheet for the heap leaching of copper and uranium ore.

FIG. 17 is a fourth embodiment 310 of a flowsheet for the heap leaching of copper and uranium ore. Similarly to the third embodiment, in the fourth embodiment, part of the heap leach is conducted under lower solution redox. The intermediate leach solution (316) arising from aerated heap leach stage 314a reports to a a number of other heap leach stages, including a pretreatment stage 314b. The pretreatment stage 314b comprises treatment of the ore material with the ILS during which the heap is not subjected to forced aeration. Accordingly, the pretreatment is conducted under reduced solution redox as compared with later stages of the leach. Because the pretreatment stage occurs near the beginning of the leach cycle, there are significant unreacted sulphide minerals which react with the ferric in the ILS converting it to ferrous. The lack of aeration creates oxygen limitation and hence there is reduced subsequent conversion of the ferrous back to ferric ions. The PLS 318 produced by the pretreatment stage 314b contains mostly dissolved uranium and some copper. The PLS is subjected to USX and CuSX 320, 322.

Because of the reasonably high acid demand (40-80 kg/T) of ores deposits in the Stuart Shelf, Australia, this translates to a high concentration of dissolved salts from the acid gangue reactions. This embodiment may result in oversaturation of the dissolved salts (eg sodium iron sulphates, such as metasideronatrite ($Na_4Fe_2(SO_4)_4(OH)_2 \cdot 3H_2O$) in the process solutions arising from the acid gangue reactions, which may in turn result in accumulation of precipitates in the heap and poor permeability. In order to address this problem, additional salt 340 may be added to the process solution/s in order to force the precipitation of oversaturated salts, 342, which can then be removed. In addition, a purge of process liquors would be required in order to keep overall salinities of process liquors within acceptable limits.

Figure 18:
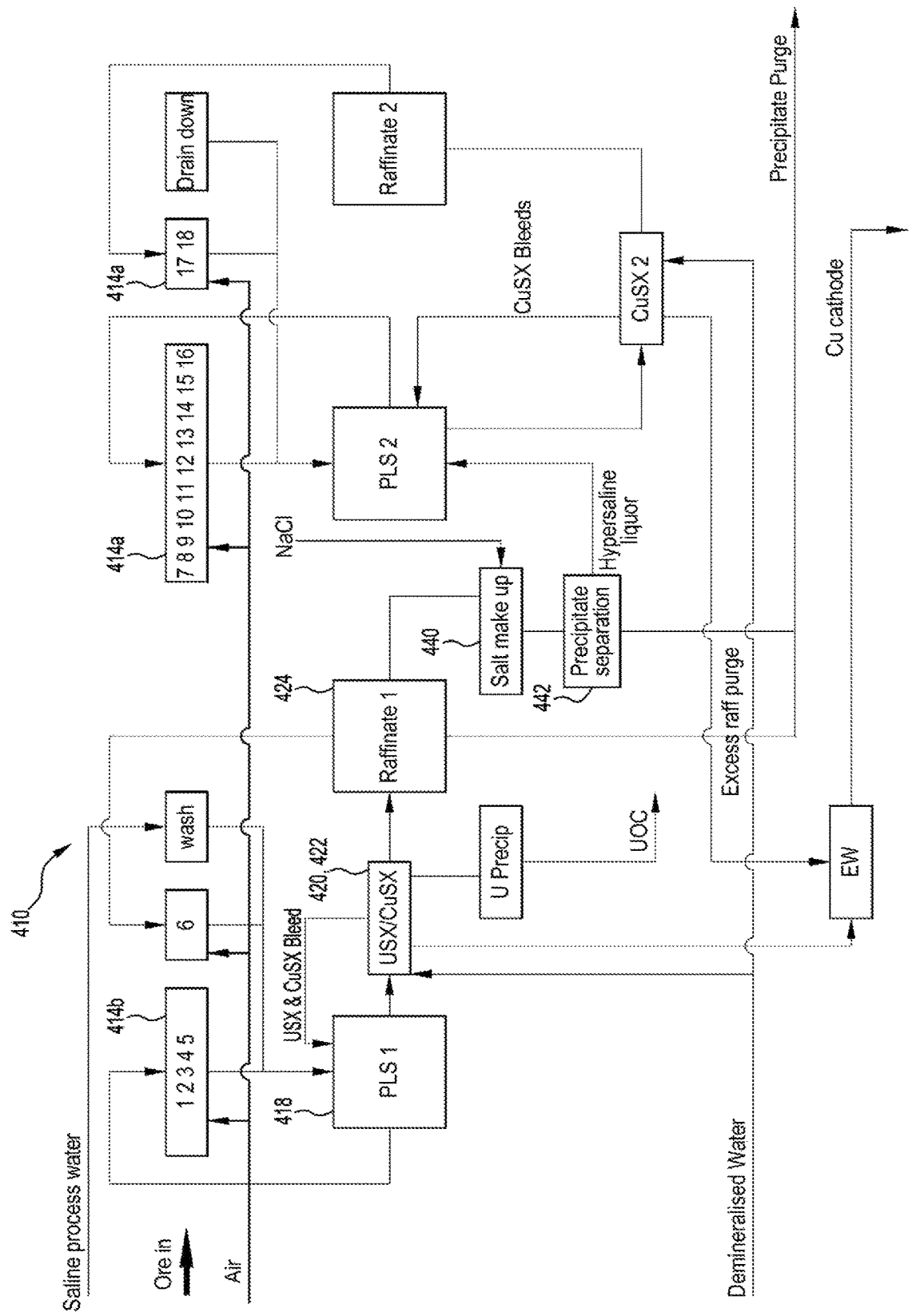
FIG. 18 illustrates in block diagram form a fifth embodiment of a flowsheet for the heap leaching of copper and uranium ore.

FIG. 18 illustrates a fifth embodiment 410 of a flowsheet for the heap leaching of copper and uranium ore. The fifth embodiment relates to the second modification of the disclosed process that includes a lower salinity pretreatment step. The heap includes a pretreatment stage 414b comprising treatment of the ore material with a pre-leach solution having a relatively low chloride content, as compared with the high chloride, acidic leach liquor in the presence of an oxidant, (ie, air). The chloride content may range up to 35 g/L. The pretreatment may be conducted for a period of time sufficient for at least the majority of uranium to be leached during this step. For example, the pretreatment stage 414b may be conducted for approximately 150 days of the overall heap leach. Moreover the majority of the gangue in the ore material reacts with the acid in the pre-leach solution resulting in a ripios that is depleted in such elements as iron and calcium. There would also be partial leaching of base metals, eg copper, during the pretreatment step. The ripios from the pretreatment step is then subjected to one or more high chloride leach stages 414a during which the chloride concentration in the leach solution is increased. The high chloride leach stage/s may be conducted for a sufficient period of time (eg, approximately 300 days) for at least the majority of copper to be leached during these stages. These stages are aerated. The depletion in gangue in the pretreatment ripios means that there is less ferrous available to form salt precipitates, such as metasideronatrite, and therefore a reduced risk of heap blockage. The PLS 418 from the pretreatment stage 414b is subjected to CuSX and USX, 420, 422. The raffinate 424 is treated with additional salt, 440, if necessary, in order to cause precipitation and removal of deleterious salts 442 prior to transfer to the high chloride leach stage/s 414a of the process. Although FIG. 18 shows the pretreatment and high chloride leach stages as being separate stages, there is not necessarily physical relocation of the leached ripios between the two stages.

Whilst a number of specific embodiments have been described, it should be appreciated that the process and plant may be embodied in many other forms.

References to the background art herein do not constitute an admission that the art forms a part of the common general knowledge of a person of ordinary skill in the art. Those references are also not intended to limit the application of the process as disclosed herein.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the process and plant as disclosed herein.

The claims defining the invention are as follows:

1. A method for recovering one or more of copper, uranium and a precious metal from an ore material, including:
   (a) forming a heap of the ore material;
   (b) during active heap irrigation under forced aeration, contacting the heap of the ore material with an iron containing acidic leach liquor having a high chloride content of a minimum of 15 g/L in the presence of an oxygen containing gas, and producing a pregnant leach solution; and
   (c) recovering one or more of copper, uranium and a precious metal from the pregnant leach solution;
   wherein, prior to contacting the ore with the acidic leach liquor in step (b), the method includes the steps of:
   i. treating the ore with a pre-leach solution having a chloride content up to 50 g/L and being relatively low as compared with the acidic leach liquor having a high chloride content of step (b), in order to dissolve at least some of the uranium and gangue minerals in the ore and produce a leachate, and to deplete deleterious elements in the ore that are available to form salt precipitates; and
   ii. treating the leachate to recover uranium and remove the deleterious elements.

2. The method of claim 1 wherein the ore material contains copper sulphides and/or uranium minerals and optionally one or more precious metals selected from gold and/or silver.

3. The method of claim 1 wherein the iron containing leach liquor contains ferric ions, which oxidize the ore material and are reduced to ferrous ions which are subsequently reoxidized to ferric ions by reaction with the oxygen containing gas, and wherein the iron containing leach liquor optionally contains cupric ions that catalyze the reaction of ferrous to ferric ions.

4. The method of claim 1 wherein the redox potential of the leach liquor exceeds 420 mV Ag/AgCl, in an absence of bioleaching microorganisms.

5. The method of claim 1 wherein the iron containing acidic leach liquor has a total iron concentration >0.1 g/L.

6. The method of claim 1 wherein the acidity of the leach liquor is such that the pH of the leach liquor contacting the ore does not exceed pH 3.5.

7. The method of claim 1 wherein the method is carried out under ambient temperature and atmospheric pressure conditions.

8. The method of claim 1 wherein the pregnant leach solution is pretreated to adjust solution chemistry prior to recovery of one or more of copper, uranium and a precious metal therefrom.

9. The method of claim 1 wherein pretreatment of the pregnant leach solution formed in step (b) comprises reduction of solution redox potential and/or consumption of at least some acid.

10. The method of claim 1 wherein prior to forming a heap in step (a), the ore material is formed into agglomerates by mixing the ore material with acidic agglomerating solution to give the agglomerates a final moisture content of up to 25 wt %.

11. The method of claim 10 wherein the acidic agglomerating solution is added to the ore material at up to 20 kg/ton ore.

12. The method of claim 1, wherein step (i) is conducted in the presence of an oxidant, such as air.

13. The method of claim 1, wherein the solution redox potential of the pre-leach solution is less than 450 mV Ag/AgCl.

14. The method of claim 1, wherein step (ii) includes recovering uranium by solvent extraction.

15. The method of claim 1 wherein the chloride content in the acidic leach liquor of step (b) is a minimum of 30 g/L.

16. The method of claim 1 wherein the chloride content in the acidic leach liquor of step (b) is a minimum of 100 g/L.

17. The method of claim 1 wherein the chloride content in the acidic leach liquor of step (b) is a minimum of 150 g/L.

18. The method of claim 1 wherein the acidic leach liquor has a total iron concentration of at least 5 g/L.

19. The method of claim 1 wherein the acidic leach liquor has a total iron concentration of at least 20 g/L.

20. The method of claim 1 wherein the pre-leach solution has a maximum chloride concentration of 35 g/L.

21. The method of claim 1, wherein the chloride content in the pre-leach solution ranges from 0 to 35 g/L.

22. The method of claim 1, wherein the solution redox potential of the pre-leach solution ranges from 390 to 420 mV Ag/AgCl.

* * * * *